US012705668B1

(12) United States Patent
Bowman et al.

(10) Patent No.: US 12,705,668 B1
(45) **Date of Patent: *Aug. 11, 2026**

(54) PARAMETERIZED METHOD, DEVICE, AND USER INTERFACE FOR ENABLING FILTERING

(71) Applicant: Ignition Interfaces, Inc., Jacksonville Beach, FL (US)

(72) Inventors: David Bowman, Ponte Vedra Beach, FL (US); Matthias Bowman, Scarsdale, NY (US); Derek Sasaki-Scanlon, Monroe, CT (US)

(73) Assignee: Ignition Interfaces, Inc., Jacksonville Beach, FL (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/755,031

(22) Filed: Jun. 26, 2024

Related U.S. Application Data

(63) Continuation of application No. 17/216,238, filed on Mar. 29, 2021, now Pat. No. 12,073,457.

(51) Int. Cl.
*G06Q 30/00* (2023.01)
*G06N 20/00* (2019.01)
*G06Q 30/0601* (2023.01)

(52) U.S. Cl.
CPC ......... *G06Q 30/0641* (2013.01); *G06N 20/00* (2019.01)

(58) Field of Classification Search
None
See application file for complete search history.

(56) References Cited

U.S. PATENT DOCUMENTS 5,537,618 A 7/1996 Boulton et al.
6,850,252 B1 2/2005 Hoffberg
(Continued)

FOREIGN PATENT DOCUMENTS

WO 2008104924 A2 9/2008
WO 2011063296 A1 5/2011
WO 2013116816 A1 8/2013

OTHER PUBLICATIONS

Huynh, D.F., Miller, R.C. and Karger, D.R., Enabling web browsers to augment web sites' filtering and sorting functionalities, Oct. 2006, In Proceedings of the 19th annual ACM symposium on User interface software and technology, pp. 125-134. (Year: 2006).*
(Continued)

*Primary Examiner* — Jeffrey A. Smith
*Assistant Examiner* — Brittany E Bargeon
(74) *Attorney, Agent, or Firm* — Sterne, Kessler, Goldstein & Fox P.L.L.C.

(57) ABSTRACT

Disclosed herein are embodiments for processing an information screen to enable filtering of another information screen. Embodiments operate by identifying a UI element code in the information screen based on a parameter data structure. The embodiments request a set of filter responses from a database based on the parameter data structure. The embodiments generate a set of UI elements that are each configured to perform a first action performed by the UI element code. Each UI element is further configured to perform a second action comprising filtering the other information screen using one of the set of filter responses. The embodiments then present the information screen with the generated set of UI elements to enable filtering of the other information screen.

20 Claims, 17 Drawing Sheets

(56) References Cited

U.S. PATENT DOCUMENTS 6,850,255 B2 2/2005 Muschetto
7,206,756 B1 4/2007 Walsky
7,330,829 B1 2/2008 Tenorio
7,941,751 B2 5/2011 Ebert
8,019,660 B2 9/2011 Westphal
8,046,804 B2 10/2011 Kelts
8,219,925 B2 7/2012 Othmer et al.
8,271,878 B2 9/2012 Kane et al.
8,484,241 B2 7/2013 Bouse et al.
8,775,332 B1 7/2014 Morris et al.
8,984,412 B2 3/2015 Lim et al.
8,984,415 B2 3/2015 Rose et al.
9,092,797 B2 7/2015 Perez et al.
9,104,287 B2 8/2015 Balchandran et al.
9,237,138 B2 1/2016 Bosworth et al.
9,310,974 B1 4/2016 Narayanan
9,335,885 B1 5/2016 Brocato
9,530,156 B2 12/2016 Tyra et al.
9,881,318 B1 1/2018 Krishnamoorthy et al.
10,198,514 B1 * 2/2019 Krotkov .............. G06F 16/9535
10,346,900 B1 7/2019 Wilson et al.
10,430,211 B2 10/2019 Bowman et al.
10,599,738 B1 3/2020 Bayliss-Mcculloch et al.
10,705,859 B2 7/2020 Paratey et al.
10,802,842 B1 10/2020 Bowman et al.
11,204,785 B1 12/2021 Bowman et al.
11,698,801 B1 7/2023 Bowman et al.
12,073,457 B1 * 8/2024 Bowman ............ G06Q 30/0641
2002/0065813 A1 5/2002 Scanlon et al.
2002/0128908 A1 9/2002 Levin et al.
2005/0086608 A1 4/2005 Roessler
2007/0192166 A1 8/2007 Van Luchene
2008/0097830 A1 4/2008 Kim
2008/0163069 A1 7/2008 Eilers
2008/0250122 A1 10/2008 Zsigmond et al.
2008/0270101 A1 10/2008 Salmela
2008/0306886 A1 12/2008 Otto et al.
2009/0018912 A1 1/2009 Altberg et al.
2009/0164341 A1 6/2009 Sunvold et al.
2009/0171754 A1 7/2009 Kane et al.
2009/0199133 A1 8/2009 Deutsch et al.
2009/0271735 A1 10/2009 Anderson et al.
2011/0264560 A1 * 10/2011 Griffiths ............ G06Q 30/0641 705/27.1
2012/0089933 A1 4/2012 Garand et al.
2013/0311875 A1 11/2013 Pappas et al.
2013/0339870 A1 12/2013 Tandra Sishtla et al.
2014/0351085 A1 11/2014 Kotas et al.
2015/0149962 A1 5/2015 Jakobs et al.
2015/0170149 A1 6/2015 Sharma et al.
2016/0148304 A1 5/2016 Srinath et al.
2016/0239904 A1 8/2016 Washington et al.
2017/0068991 A1 3/2017 Lim
2017/0083886 A1 3/2017 Silva et al.
2017/0091844 A1 3/2017 Yarvis et al.
2017/0220943 A1 8/2017 Duncan et al.
2018/0024819 A1 1/2018 Hwang et al.
2018/0074831 A1 * 3/2018 Bowman ................. G06F 9/451
2018/0203571 A1 7/2018 Dayanandan et al.
2018/0239616 A1 8/2018 Moattar-Aliabadi et al.
2018/0253792 A1 9/2018 Conway et al.
2019/0361929 A1 11/2019 Rogynskyy et al.
2020/0005341 A1 * 1/2020 Marsh .................... G06Q 40/06
2020/0034124 A1 1/2020 Rahmathali et al.
2020/0058050 A1 * 2/2020 Narasimhan ....... G06Q 30/0254
2020/0117336 A1 4/2020 Mani et al.
2020/0183988 A1 * 6/2020 Vasthimal ............... G06F 9/451
2020/0320365 A1 10/2020 Arat et al.
2021/0049548 A1 2/2021 Grisz et al.
2021/0049674 A1 2/2021 Periyathambi et al.
2021/0150127 A1 5/2021 McCulloh et al.

OTHER PUBLICATIONS

Huynh, D.F., Miller, R.C. and Karger, D.R., Enabling web browsers to augment web sites' filtering and sorting functionalities, Oct. 2006, In Proceedings of the 19th Annual ACM ssymposium on User interface software and technology, pp. 125-134. (Year: 2006).*

Huynh, D.F., et al., "Enabling Web Browsers to Augment Web Sites' Filtering and Sorting Functionalities," In Proceedings of the 19th annual ACM symposium on User interface software and technology pp. 125-134, (Oct. 2006).

Bowman, D. et al., U.S. Appl. No. 17/216,238, filed Mar. 29, 2021, entitled "Parameterized Method, Device, and User Interface for Enabling Filtering."

Bowman, D. et al., U.S. Appl. No. 18/201,973, filed May 25, 2023, entitled "Parameterized User Interface for Capturing User Feedback."

* cited by examiner

Set of Filter Responses 300

| ID 302 | Category 304 | Filter Response 306 | Weight 308 |
|---|---|---|---|
| 1 | General | Less than $24 | 1 |
| 1 | General | Around $24 | 2 |
| 1 | General | Greater than $24 | 3 |
| 1 | General | Zinfandel | 4 |
| 1 | General | California | 5 |
| 1 | General | 1996 | 6 |
| 1 | Preferred | Paul Doran Vineyards | 7 |
| 1 | Preferred | Napa | 8 |

FIG. 3A

Set of Filter Responses 320

| ID 322 | Filter Response 324 | Widget Tag ID 326 |
|---|---|---|
| 1 | Less than $24 | 1 |
| 2 | Around $24 | 1 |
| 3 | Greater than $24 | 1 |
| 4 | Zinfandel | 4 |
| 5 | California | 2 |
| 6 | 1996 | 3 |

Widget Tags 328

| ID 330 | Widget Tag 332 |
|---|---|
| 1 | price |
| 2 | region |
| 3 | vintage |
| 4 | grapeVariety |

FIG. 3B

Set of Filter Responses 330

| ID 332 | Filter Response 334 | Weight 336 |
|---|---|---|
| 1 | Less than $24 | 1 |
| 1 | Around $24 | 3 |
| 1 | Greater than $24 | 5 |

Set of Filter Responses 340

| ID 342 | Filter Response 344 | Weight 346 |
|---|---|---|
| 1 | Zinfandel | 2 |
| 1 | California | 4 |
| 1 | 1996 | 6 |

Set of Filter Responses 350

| ID 352 | Filter Response 354 | Weight 356 |
|---|---|---|
| 1 | Less than $24 | 1 |
| 1 | Zinfandel | 2 |
| 1 | Around $24 | 3 |
| 1 | California | 4 |
| 1 | Greater than $24 | 5 |
| 1 | 1996 | 6 |

FIG. 3C

```
<form action="return_to_search_results.php" method="get">
<button id="1" type="submit" formaction="return_to_search_results.php">Return
to Search Results</button>
</form>
```

FIG. 4

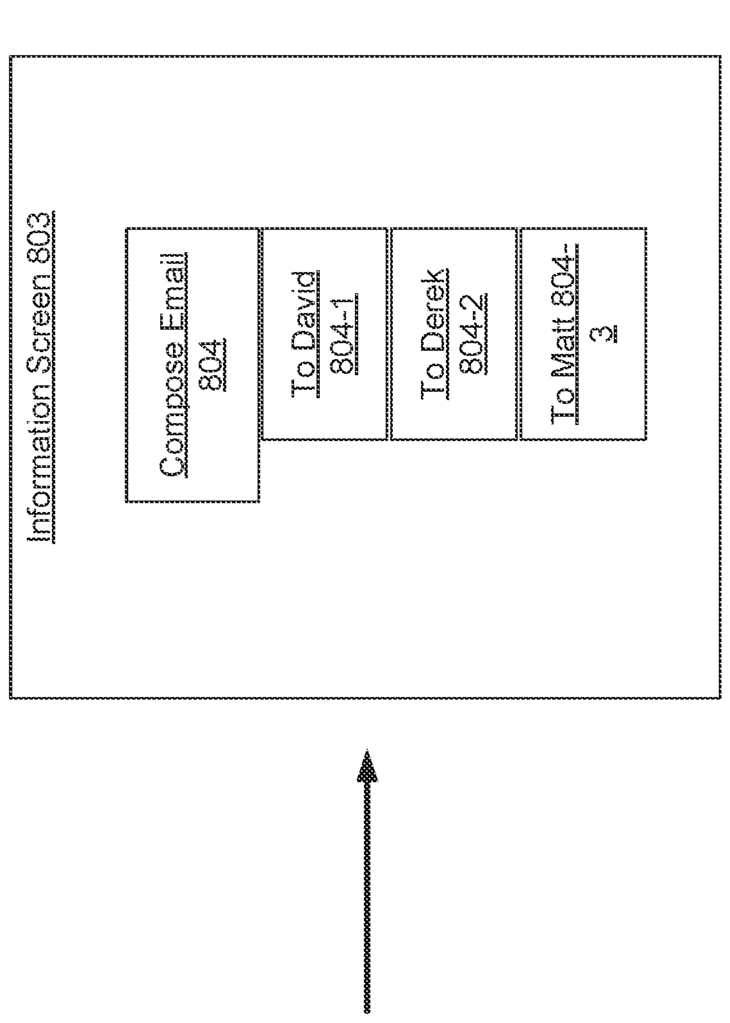
Information Screen 803
Compose Email 804
To David 804-1
To Derek 804-2
To Matt 804-3
FIG. 8
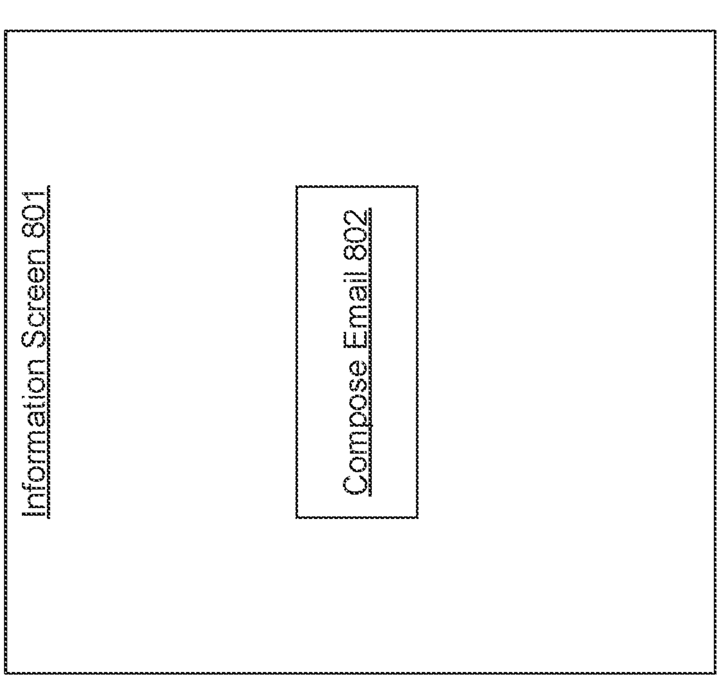
Information Screen 801
Compose Email 802

UI Markup 1000

```
<head><title>Wine Bottle Description</
title></head>

<body>

<img src="wine_bottle.jpg" />

<div>ACME Chardonnay Wine Bottle</div>

<button>Add to Cart</button>

<div id="content_area">

Sourced from vineyards overlooking the
Napa Valley, ACME Vineyard's Chardonnay
is a dry, medium to full bodied wine with
flavors of papaya and pineapple, and notes
of vanilla. A wonderful 2019 vintage.

</div>

</body>
```

FIG. 10

| Set of Filter Responses 1300 | | |
|---|---|---|
| ID 1322 | Filter Response 1324 | Filter Category ID 1326 |
| 1 | Less than $24 | 1 |
| 2 | Around $24 | 1 |
| 3 | Greater than $24 | 1 |
| 4 | Chardonnay | 4 |
| 5 | California | 2 |
| 6 | 2019 | 3 |
| 7 | Riesling | 4 |
| 8 | Sauvignon Blanc | 4 |

| Set of Filter Categories 1328 | |
|---|---|
| ID 1330 | Filter Category 1332 |
| 1 | Price |
| 2 | Region |
| 3 | Vintage |
| 4 | Grape Variety |

FIG. 13

PARAMETERIZED METHOD, DEVICE, AND USER INTERFACE FOR ENABLING FILTERING

CROSS-REFERENCE TO RELATED APPLICATION

This application is a continuation of U.S. application Ser. No. 17/216,238, filed Mar. 29, 2021, the disclosure of which is incorporated by reference herein in its entirety.

OVERVIEW

Entities (e.g., businesses, organizations, charities, government entities, or persons providing content) often want to allow users to filter an information screen. For example, an entity may want to allow a user viewing a product to return to their search results and filter the results based on various characteristics of the viewed product.

Entities often provide filters for their websites and software applications. For example, a business may provide filter options next to search results after a user conducts a search. However, such websites and software applications do not provide filtering associated with a particular action at the time the user actually performs the action. More specifically, such websites and software applications do not filter through a relevant user interface (UI) element at a relevant time. For example, an entity does not allow a user to add or modify the active filtering criteria when the user clicks the "return to search results" button after viewing a page displaying the details of one of the products listed in a search results page.

Moreover, websites or software applications often include one or more static UI elements. A static UI element can be a non-interactive UI element such as, but not limited to, text, an image, a symbol, video, audio, etc. An entity does not allow a user to filter through these static UI elements even though these static UI elements often logically represent the type of filtering the user would like to perform. For example, a user may view a web page displaying the details of a product. The web page may display the cost of the product as a static UI element. In this case, the user may prefer to click the cost of the product to filter their search results based on the cost.

Because such websites or software applications do not enable filtering associated with a particular action at the time of performance, or through a relevant UI element, such websites or software applications cannot ensure that users had access to relevant filtering criteria at the relevant time. For example, a shopping website may allow a user to filter search results before they a view a particular product in detail. However, because the shopping website requests filtering before the user views the product, the shopping website cannot ensure the user had a good idea of what filters would be useful to apply.

Entities therefore need a way to generate a UI in their websites and software applications that enables filtering associated with performing a particular action at the time a user actually performs the action (e.g., when the user has an idea what they want to filter). This may prevent a user from skipping filtering, or from using irrelevant or inaccurate filtering criteria. However, generating a UI to enable different types of filters associated with performing a particular action at the time a user actually performs the action is cumbersome and labor intensive. This is because an entity is often forced to modify the UI code to add new types of filters and remove irrelevant filters. This can be error prone, labor intensive, and may require a computer programmer.

In addition, because such filtering mechanisms are often directly integrated into the UI code, there is no easy way to enable a third-party entity to add or change the type of filtering provided. This may be problematic because an entity may not know which types of filters to provide to its users. Instead, the entity may prefer to delegate creation of filters to a third-party entity. For example, a marketing firm may know better than the entity itself which types of filters users want to apply. Thus, an entity needs a way to enable third-party entities to specify what types of filters to use while preventing the third-party entities from directly modifying the UI code.

There is also no easy way to dynamically customize the filtering options based on the user, previous user interactions with the UI, and various other criteria. Moreover, there is no easy way to evaluate the performance of different versions of the UI to see what UI design elements work best for particular users and or the entity itself. Finally, there is no easy way to dynamically update the filtering options and or look and feel of the UI based on these evaluations.

Hence, what is needed is a technological solution to the technological problem of how to generate a UI to filter an information screen through a relevant UI element at a relevant time without directly modifying the UI code.

BRIEF DESCRIPTION OF THE DRAWINGS

The accompanying drawings are incorporated herein and form a part of the specification.

FIG. 3A is an example set of filter responses for a system that processes a UI to enable filtering of an information screen based on one or more parameters, according to some embodiments.

FIG. 3B is another example set of filter responses for a system that processes a UI to enable filtering of an information screen based on one or more parameters, according to some embodiments.

FIG. 3C shows another example set of filter responses for a system that processes a UI to enable filtering of an information screen based on one or more parameters, according to some embodiments.

FIG. 4 is an example markup for an information screen for an online wine store application, according to some embodiments.

FIG. 8 is an example display of an information screen for an application without processing, and the information screen after processing to enable filtering of another information screen based on one or more parameters, according to some embodiments.

FIG. 10 is an example markup for an information screen for an online wine store application, according to some embodiments.

FIG. 13 is example set of filter responses for a system that processes a UI to enable filtering of an information screen via one or more static UI elements, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
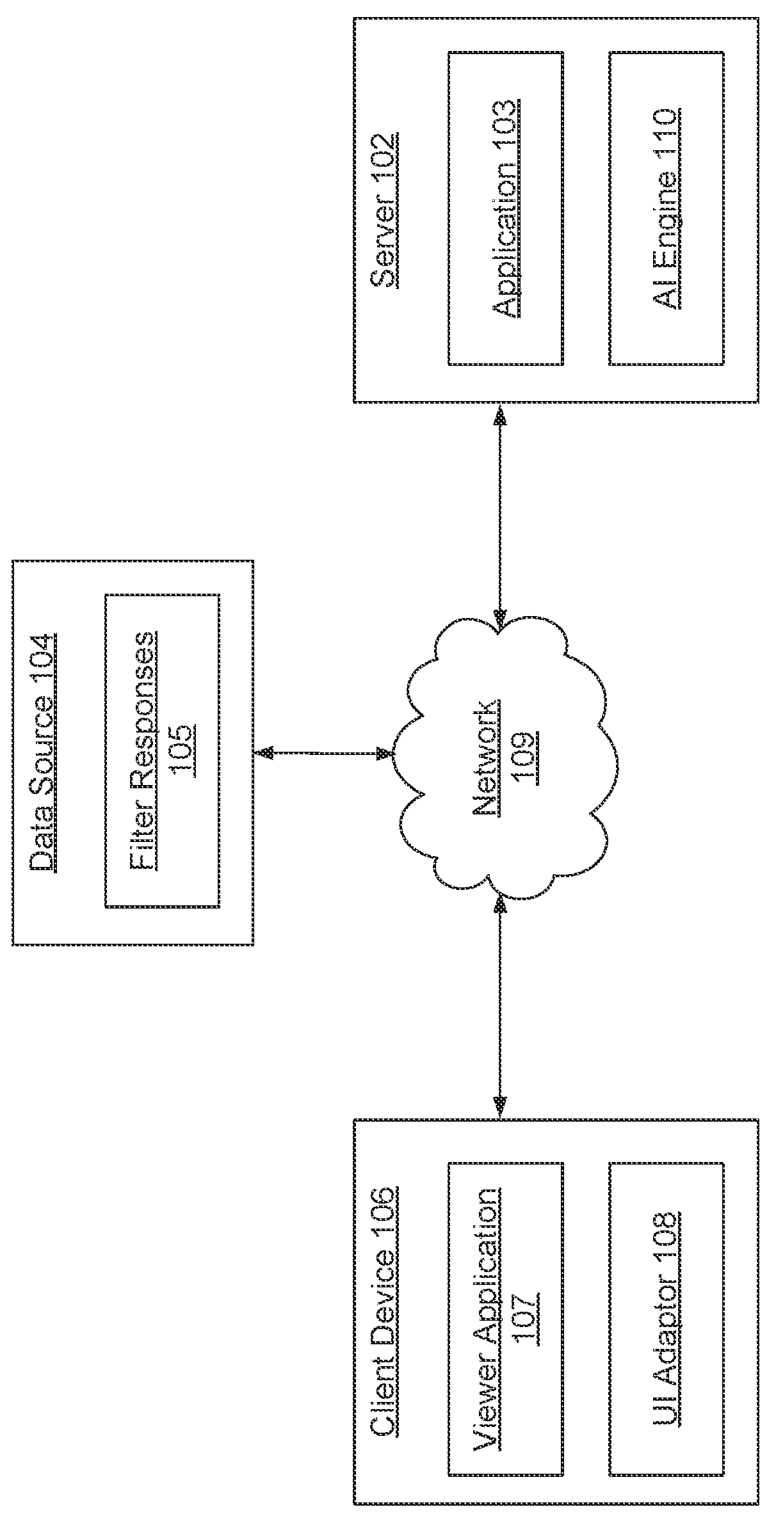
FIG. 1 is a block diagram of a system for processing a user interface (UI) of a website or software application to enable filtering based on one or more parameters, according to some embodiments.

Provided herein are system, apparatus, device, method and/or computer program product embodiments, and/or combinations and sub-combinations thereof, for processing a user interface (UI) of a website or software application to enable filtering of an information screen based on one or more parameters.

Traditionally, a website or software application provides the opportunity to add or modify filtering parameters at a different point in time than when a user is in the best position to provide relevant filter parameter specifications. For example, consider the case where a user is interested in buying a bottle of wine from an online shopping website. The user interface first loads the website in the user's web browser. The user interface then loads a list of bottles of wine available for purchase. The user may filter the list of bottles based on various criteria. Once the user finds a wine bottle of interest, the user may select that bottle, causing the user interface to display a product detail page about the bottle.

For example, this product detail page may display the price, region, vineyard, and year of the bottle. It is often at this point, regardless of the filter options narrowing down the list of bottles displayed earlier on the page with the list of bottles, that the user determines which filter options are relevant to them. In other words, it may be that the user only realizes they want to filter on particular criteria after they have viewed a product detail page.

For example, while viewing the product detail page, the user may like the description of the vineyard but think that particular bottle is too expensive. Traditionally, the user may then click the "return to search results" button to go back to their search results. Having returned to the search results list, the user may then apply to the search results the filter criteria they learned from the just viewed bottle. The user may also apply particular criteria about the just viewed bottle to the search results. Thus, the shopping website forces the user to filter the list of bottles in the search results after leaving the product detail page.

This can require the user to remember all the criteria that they liked about the viewed bottle. This is often cumbersome and error prone. In addition, it can require the website to allow the user to be able to select all these criteria (which means that all of these criteria must be displayed) even though all of the criteria may not be relevant to all bottles. However, often times the website or software application does not display all available filter options because many of the filter criteria are generally not applicable to many of the wine bottles or the user. Moreover, the website or software application may not display all available filter options because there are simply too many to list without overwhelming the user. For example, this may be the case on small screen devices.

Because of these issues, the user may give up trying filters to locate their ideal bottle. In this case, the shopping website may lose a sale. In addition, this may create user frustration and dissatisfaction and cause the user to choose not to shop at the shopping website again.

Even if the user does directly filter through the initial search results list page, the shopping website may not be able to ensure the user is providing filter criteria that is relevant and accurate to previously browsed items. This is because the search results page may not be able to ensure that it received relevant filter criteria for a product the user previously viewed. For example, the search results page may have wine bottles from hundreds of wine regions. Moreover, the search results page may not be able to display filters for all the wine regions. Thus, the user may not become aware of the wine region that she wants to filter on until after she noticed it in the product detail page.

Embodiments herein operate by identifying one or more UI element codes (e.g., UI element codes for generating buttons, checkboxes, list boxes, tabs, arrows, video players, audio players, video game players, etc.) in a UI code of an information screen based on a parameter data structure. However, as would be appreciated by a person of ordinary skill in the art, the UI code need not include a parameter data structure. Embodiments may request a set of filter responses (e.g., a list of search strings related to the task the user is performing) from a data store based on the parameter data structure. Thus, in some embodiments, configuration of the set of filter responses in the data store may be all that is required. Embodiments may generate a set of UI elements based on the identified set of UI element codes and the set of filter responses. Some other embodiments may transform the identified set of UI element codes into different UI elements instead of generating a set of UI elements. Embodiments then present the set of UI elements in the information screen to a client to enable filtering of an information screen. Because the UI of the website or software application is generated at the time a user performs a particular task, an entity can enable filtering through a relevant portion of the UI at a relevant time. In other words, the generated UI elements also filter at the same time a user performs a particular action associated with one of the generated UI elements. In addition, an entity can manage the types of filtering performed independently of the website or software application. This enables the entity to quickly change the type of filtering performed. Finally, an entity can enable more tailored types of filtering as needed.

Embodiments herein further operate by identifying one or more static UI elements for a first information screen. A static UI element can be a non-interactive UI element such as, but not limited to, text, an image, a symbol, video, audio, etc. A static UI element may not be configured to perform any action.

For example, embodiments here may identify the one or more static UI elements in UI code for the first information screen based on a parameter data structure. However, as would be appreciated by a person of ordinary skill in the art, the UI code need not include a parameter data structure. Embodiments may request a set of filter responses from a data store based on the static UI element. Embodiments may generate a UI element based on the set of filter responses. The generated UI element may be configured to perform a first action of requesting a second information screen and a second action comprising filtering the second information screen using the filter response. Embodiments then present the UI element in the first information screen to a client to enable filtering of the second information screen. This solves the technological problem of how to request and apply additional filter criteria to an information screen (e.g., the search results) via a static UI element in a single request.

Figure 6:
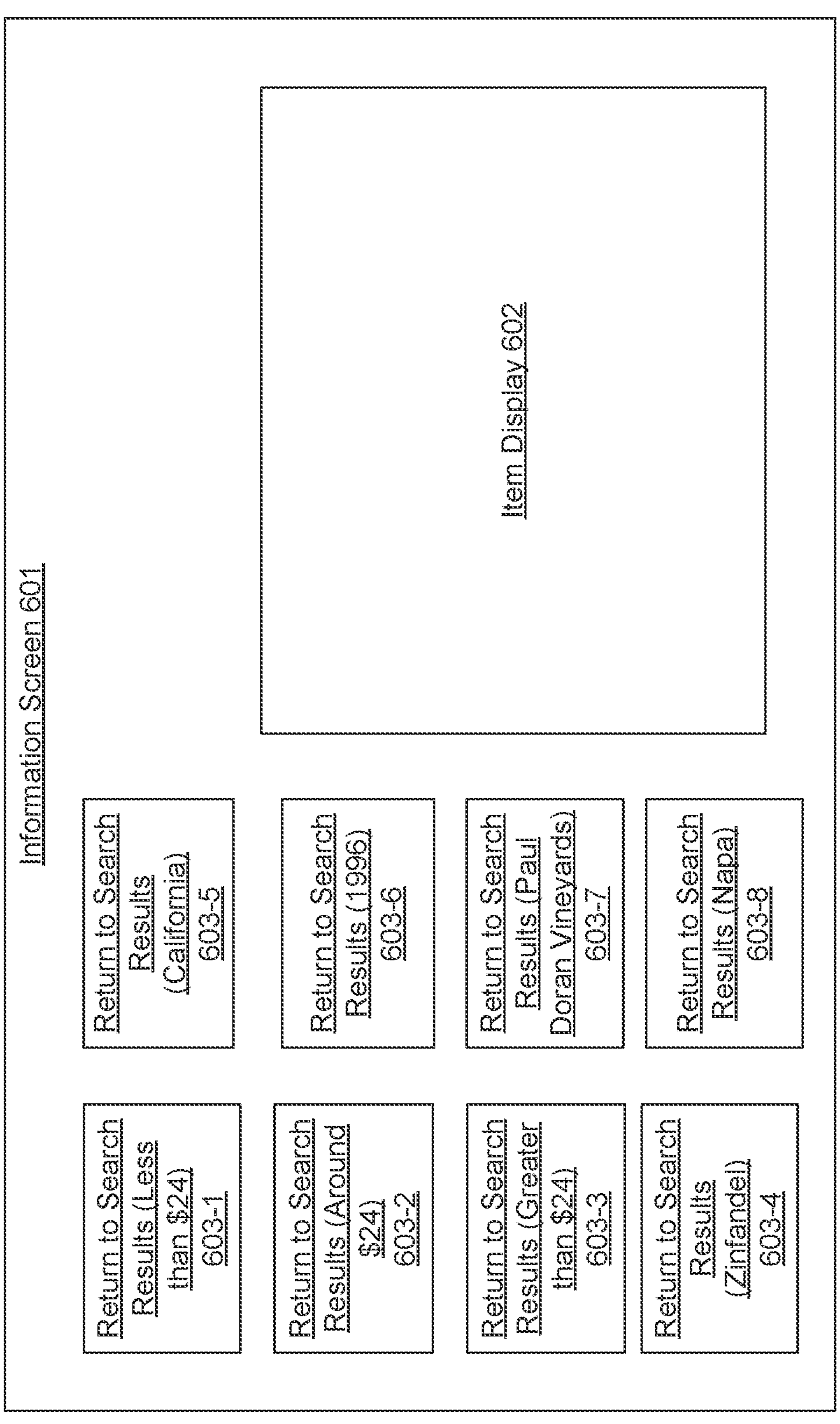
FIG. 6 is an example display of an information screen for an online wine store application after processing to enable filtering of another information screen based on one or more parameters, according to some embodiments.

In the case of the above wine example, instead of filtering before the user views the product detail page, or filtering without helpful constraints after the user has viewed the product detail page and has returned to the search results list page, embodiments herein can enable the shopping website user to add or modify filter criteria when the user actually finds a wine bottle of interest that is somewhat relevant to them. For example, this can occur by clicking the return to search results button, or by clicking a generated UI element corresponding to a static UI element. For example, the shopping website may specify several available filter responses that the user may use to filter the search results list based on characteristics of the wine bottle currently being viewed on the product detail page. Each filter response may be used to generate a custom "return to search results" button, and each "return to search results" button may be generated just prior to the user loading the wine bottle product detail page. For example, and as illustrated in FIG. 6, one "return to search results" button may be labeled "Return to Search Results (Less than $24)" based on the filter response "Less than $24." When the user clicks the button labeled "Return to search results (Less than $24)", the button will trigger the action "return to the search results" and simultaneously trigger the action "filter the search results list for wine bottles 'Less than $24.'" Another return to search results button may be labeled "Return to search results (Zinfandel)." When a user clicks the button labeled "Return to search results (Zinfandel)," the button will trigger the action "return to the search results page" and simultaneously trigger the action "filter the search results list for wine bottles that are 'Zinfandel.'" Another return to the search results button may be labeled "Return to search results (1996)." When a user clicks the button labeled "Return to search results (1996)," the button will trigger the action "return to the search results" and simultaneously trigger the action "filter the search results for wine bottles from '1996." As a result, the shopping website provides for the filters at the time the user actually looks at a potentially relevant item by clicking the return to search results button. Moreover, the shopping website filters through a relevant UI element (e.g., the return to search results button). Because the user is required to click the return to search results button to get back to the search results, the shopping website may receive accurate and tailored filters from the user.

Embodiments here provide several benefits related to the above example. First, because the return to search results button may directly capture the correct and relevant filter to apply for the user viewing the product, this can prevent the user from skipping filtering, or from using irrelevant or inaccurate filter criteria.

Second, because a static UI element often logically represents the type of filtering a user would like to perform, the generation of a UI element for the static UI element can enable the user to filter the search results page through a relevant UI element at the relevant time. For example, a user may view a web page displaying the details of wine bottle. The web page may display the cost of the wine bottle as a static UI element. In this case, embodiments herein enable the user to click the cost of the wine bottle to filter their search results based on the cost.

Third, because the return to search results button may directly capture the correct and relevant filter to apply for the user viewing the product, the shopping website can store details about the filtering (e.g., user feedback) based on factors directly associated with the clicking the return to search results button. For example, in association with storing the user's product preferences inferred via the user's filtering activity, the shopping web site can also store what wine bottle the user viewed, the time the user viewed the bottle, how much the bottle cost, or how many reward points the user had just before she viewed the bottle.

Fourth, because the filter responses may be specified in a data store, and not in the UI code of the shopping website, the filter responses can easily be changed by an agent of the shopping website to enable new types of filtering without having to modify the UI code. This reduces webpage development time and software bugs that often occur when modifying webpage source code. It also reduces the need to develop separate filtering webpages and routinely modifying webpages to perform new types of filtering. In other words, because the types of filtering done by the generated UI elements can be specified by a third-party entity in a data source outside the UI code of the software application or website, the error prone and labor intensive process of routinely modifying the UI code of the software application or website to enable new types of filtering can be reduced.

Fifth, because the filter responses can be decoupled from the UI code, the shopping website can dynamically customize the filtering options based on the user, previous interactions with the software application or website, previous purchase history, or various other criteria as would be appreciated by a person of ordinary skill in the art. For example, embodiments can combine filter responses from various sets of filter responses in a data store and provide an aggregated set of filter responses tailored to a particular user or set of users.

Sixth, because the filter responses can be decoupled from the UI code, the shopping website can test the performance of different versions of the UI having different appearances or filter responses to see what works best for users or the shopping website itself. The shopping website can then dynamically update the appearance or filtering responses for the UI based on this testing.

Finally, in this example, because the return to search results button both filters and performs an action, the amount of data obtained per click, per minute, or per visitor is increased. This reduces the number of network requests being performed, which saves compute cycles, network bandwidth, and potentially increases the battery life of mobile clients.

FIG. 1 is a block diagram of a system 100 for processing a UI of a website or software application to enable filtering of an information screen based on one or more parameters, according to some embodiments. System 100 includes a server 102, a data source 104, and a client device 106.

Server 102 may be a server computer, computer cluster, cloud computing platform, desktop computer, laptop computer, tablet computer, smart phone, smart watch, personal digital assistant, or other type of electronic device as would be appreciated by a person of ordinary skill in the art. Server 102 can communicate with client device 106 operated by a user over a network 109. Network 109 may be any network or combination of networks including the Internet, a local area network (LAN), a wide area network (WAN), a wireless network, a cellular network, or various over types of networks as would be appreciated by a person of ordinary skill in the art.

In some embodiments, server 102 may include an artificial intelligence (AI) engine 110. In some other embodiments, client device 106 may include AI engine 110. In some other embodiments, another electronic device (e.g., data source 104) may include AI engine 110. AI engine 110 may be any type of AI engine that generates filter responses 105 for use by UI adaptor 108 to enable a user to filter an information screen. AI engine 110 may be a software application. AI engine 110 may also be a computer processor or other type of hardware device as would be appreciated by a person of ordinary skill in the art.

Client device 106 may be any computing device that can communicate with server 102 including a desktop computer, laptop computer, tablet computer, smart phone, smart watch, personal digital assistant, or other type of electronic device as would be appreciated by a person of ordinary skill in the art. In some embodiments, client device 106 may include a viewer application 107 to display a UI of an application 103 from server 102. In some other embodiments, client device 106 may include application 103. Application 103 may be any type of software application that presents a UI. For example, application 103 may be a web application.

Viewer application 107 may be a software application for retrieving and presenting a UI for application 103. For example, viewer application 107 may be a web browser such as Microsoft Internet Explorer®, Microsoft Edge®, Mozilla Firefox®, Apple Safari®, and Google Chrome® web browsers. Viewer application 107 may also be a mobile application such as, but not limited to, an Apple iOS app, a Google Android app, or various other mobile application types as would be appreciated by a person of ordinary skill in the art. Viewer application 107 may display one or more information screens representing the UI of application 103. As would be appreciated by a person of ordinary skill in the art, viewer application 107 may output one or more information screens representing the UI of application 103 using various other output forms.

An information screen may include content for application 103 and one or more UI elements (e.g., buttons, checkboxes, list boxes, or tabs) for interacting with the content. An information screen may be a webpage. An information screen may also be a UI screen for a desktop, laptop, tablet, or smartphone software application. An information screen may also be a UI screen for a point of sale (POS) terminal, kiosk, or automated teller machine (ATM). In An information screen may include border UI elements (e.g., the chrome) of viewer application 107 such as, but not limited to, a close button, a minimize window button, and/or a maximize window button.

An information screen may include one or more various UI elements. For example, an information screen may include buttons, checkboxes, list boxes, combo boxes, split buttons, video players, audio players, video game players, and other types of UI elements as would be appreciated by a person of ordinary skill in the art. A user at client device 106 may interact with the UI elements using a computer mouse, keyboard, touch screen, an input device that operates using natural voice, an input device that operates using eye movement, an input device that operates using facial recognition, or other type of input device as would be appreciated by a person of ordinary skill in the art.

A UI element in an information screen may perform an action. For example, a user may click, tap, long press, hover over, use voice, eye movements, body movements, or other gestures, or otherwise trigger a button to submit a form. In response, the button may transmit the form to a server.

In some embodiments, performing an action associated with a UI element may generate a new, and possibly, different information screen. For example, when a user clicks a "Return to Search Results" button on a product detail webpage of a shopping website, the website may generate a new information screen that lists the user's previous search results but does not include the "Return to Search Results" button anymore. For another example, when a user clicks a "Compose Message" button on a webpage of a collaboration website, the website may generate a new information screen that displays a message editor but does not include the "Compose Message" button anymore.

Traditionally, performing an action associated with a UI element does not directly filter an information screen. For example, a traditional UI element does not filter an information screen that is generated as a result of performing an action associated with the UI element (e.g., filter the user's previous search results for low cost products by clicking the "Return to Search Results" button). Rather the traditional UI element (e.g., the "Return to Search Results" button) may perform the action (e.g., returning to the search results) and the entity may have to apply filter criteria from the user who performed the action after the user performs the action. As a result, entities may not enable users to filter an information screen through a relevant UI element (e.g., a "Return to Search Results" button) at a relevant time (e.g., when leaving a product detail webpage on a shopping website).

Embodiments herein solve at least the technological problems of how to obtain additional filter responses with a single action request, and how to customize UI elements on a user interface without making changes to the underlying UI code. Embodiments herein further solve at least the technological problem of how to filter an information screen through a relevant UI element using dynamically generated filter responses for different users and or use cases. Embodiments herein further solve at least the technological problem of how to test different UIs or filter responses for different users or use cases and adapt the UI based on the testing.

Typically, when generating a UI of a website or software application, a computer system will read and process the UI code. Each time the system encounters a UI element code in the UI code, e.g., an HTML "<button>" or "<a href>" tag, a UI element is generated. The UI element code may be any type of computer instruction in the UI source that generates a UI element, e.g., an operation, function call, tag, etc.

In some embodiments, UI adaptor 108 solves the technological problem of capturing and applying additional filter responses with a single action request using a parameter data structure. The parameter data structure may be a unique numerical identifier, alphanumerical identifier, or a compound data structure including several fields. The parameter data structure may be added to a UI element code in the UI code for the website or software application so that when UI adaptor 108 encounters this type of UI element code, it will read the parameter data structure and execute a function that requests a set of filter responses (e.g., filter responses 105) in a data source (e.g., data source 104). A filter in the set of filter responses can be used to select a subset of data in a data source (e.g., a product catalog) that matches the filter response. A filter response can be a query, search string, regular expression, image, sound, or other type of data as would be appreciated by a person of ordinary skill in the art. As would be appreciated by a person of ordinary skill in the art, a filter response in the set of filter responses may need to satisfy the input format of the data source being filtered. For example, if the data source is a database management system (DBMS) that executes queries using structured query language (SQL), the filter response may need to satisfy the input format of SQL. In some embodiments, an additional interface may be used to convert the filter response to SQL format.

After reading the parameter data structure and executing a function that requests a set of filter responses, UI adaptor 108 may generate a set of UI elements for the identified UI element code that perform filtering based on the set of filter responses. In some embodiments, instead of generating the set of UI elements, UI adaptor 108 transforms the identified UI element code into one or more different UI elements that filter based on the set of filter responses. As would be appreciated by a person of ordinary skill in the art, generating a set of UI elements will be referred herein interchangeably with transforming the identified UI element code. Moreover, as would be appreciated by a person of ordinary skill in the art, UI adaptor 108 may process UI code that is human-readable computer code and UI code that is binary machine code. UI code will refer herein to both human-readable computer code and binary machine code.

In some embodiments, the set of filter responses may be provided by one or more entities (e.g., a business, organization, charity, government entity, or person providing content). An agent of an entity may insert, update, or delete filter responses from the set of filter responses (e.g., filter responses 105) in data source 104. An agent may modify the set of filter responses in data source 104 without having to modify the code of application 103. This is because the set of filter responses may be stored independently of application 103 in data source 104. As a result, the agent does not have to be a computer programmer or have technical expertise. Moreover, the agent may modify the set of filter responses without introducing programming errors into application 103. This is because the agent can modify the set of filter responses without having to modify the code of application 103.

Similarly, an agent of a marketing firm may insert, update, or delete filter responses from the set of filter responses in data source 104. The agent may act on behalf of a business or organization. This enables a business or organization to rely on the expertise of an outside company or organization (e.g., a marketing firm) to determine the type of filter responses to provide users.

In some other embodiments, the set of filter responses (e.g., filter responses 105) may be generated by AI engine 110. AI engine 110 can generate the set of filter responses (e.g., filter responses 105) from data provided by one or more entities (e.g., a business, organization, charity, government entity, or person providing content). AI engine 110 can select the set of filter responses from filter responses provided by the one or more entities. AI engine 110 can also learn a set of filter responses from data provided by the one or more entities. For example, AI engine 110 may apply machine learning to various wine trade publications. AI engine 110 may learn that wine region is an important criterion for wine drinkers. AI engine 110 may further learn that Bordeaux, Champagne, Burgundy, Napa Valley, and Sonoma are popular wine regions. AI engine 110 may therefore generate a set of filter responses that include these wine regions.

In some embodiments, AI engine 110 can generate a set of filter responses from across the one or more entities such that the set of filter responses are applicable to a particular user segment. For example, AI engine 110 can generate a set of filter responses from across different wine trade publications that are applicable to wine drinkers over the age of 50. Similarly, AI engine 110 can generate set of filter responses from across different wine trade publications that are applicable to female wine drinkers. As would be appreciated by a person of ordinary skill in the art, AI engine 110 can generate a set of filter responses across the one or more entities based on various criteria that define a particular user segment.

In some embodiments, AI engine 110 can generate a set of filter responses from across previously generated sets of filter responses. For example, AI engine 110 can generate a set of filter responses from the set of filter responses that are applicable to wine drinkers over the age of 50 and the set of filter responses that are applicable to female wine drinkers. In other words, AI engine 110 can generate a set of filter responses based on multiple sets of filter responses representing different user segments.

In some embodiments, AI engine 110 can order the filter responses in the set of filter responses based on criteria such as, but limited to, most popular filter response, most recently applied filter response, sponsored filter response, or other criteria as would be appreciated by a person of ordinary skill in the art.

In some embodiments, AI engine 110 can exclude filter responses from the generated set of filter responses based on various criteria as would be appreciated by a person of ordinary skill in the art. For example, AI engine 110 can exclude filter responses assigned a weight above or below a threshold weight value.

In some embodiments, AI engine 110 can generate the set of filter responses prior to receiving a request from UI adaptor 108 for a set of filter responses. In some other embodiments, AI engine 110 can generate the set of filter responses in response to receiving a request from UI adaptor 108 for the set of filter responses. AI engine 108 can further generate the set of filter responses based on a context variable, user profile, or various other types of criteria provided by UI adaptor 108 as would be appreciated by a person of ordinary skill in the art.

In some embodiments, UI adaptor 108 may generate the set of UI elements such that the set of UI elements perform the same action as a traditional UI element generated from the identified UI element code. However, the generated set of UI elements may also perform filtering. Because UI adaptor 108 may generate the set of UI elements for each information screen request by a client, the UI of the website or software application can be updated during each information screen request to perform different types of filtering. UI adaptor 108 may also generate the set of UI elements based on various other factors (e.g., a timer, an interaction with the UI by a user, etc.) instead of a new information screen request.

In some embodiments, client device 106 may include UI adaptor 108 to process the UI code of application 103 to enable filtering. However, as would be appreciated by a person of ordinary skill in the art, server 102 may also include UI adaptor 108 to process the UI code of application 103 to enable filtering.

In some embodiments, UI adaptor 108 may generate a set of UI elements from a UI element code in UI code for an information screen for application 103. For example, UI adaptor 108 may generate the set of UI elements based on a set of filter responses stored in data source 104 (e.g., filter responses 105). As would be appreciated by a person of ordinary skill in the art, the set of filter responses may comprise different types of filter responses. The set of filter responses may be a set of search strings (e.g., "red wine," "pinot noir OR merlot") representing filtering that a user may apply to the information screen being generated by performance of the action associated with the UI element (e.g. clicking a "Return to Search Results" button). The set of filter responses may also be a query, regular expression, image, sound, symbol, color, or other type of data as would be appreciated by a person of ordinary skill in the art. A UI element may be a button, combo box, list box, split button, hover link, hyperlink, tab, or various other types of UI elements as would be appreciated by a person of ordinary skill in the art.

Data source 104 may be a DBMS such as ORACLE®, MYSQL®, MICROSOFT SQL SERVER®, POSTGRESQL®, and IBM DB2®. In some embodiments, the DBMS may be a relational database. In some other embodiments, the DBMS may be a NoSQL or non-relational database such as MongoDB®. In some other embodiments, data source 104 may be an array data structure, linked list data structure, table, file such as a plain text file or spreadsheet file, or other repository for storing and managing a collection of data as would be appreciated by a person of ordinary skill in the art. UI adaptor 108 may connect to data source 104 over network 109 and retrieve the set of filter responses. UI adaptor 108 may then generate UI elements based on the set of filter responses for an information screen of application 103.

Data source 104 may be implemented on a server computer, computer cluster, cloud computing platform, desktop computer, laptop computer, tablet computer, smart phone, smart watch, or various other type of electronic device as would be appreciated by a person of ordinary skill in the art. In some embodiments, data source 104 may be implemented on server 102.

In some embodiments, UI adaptor 108 may connect to data source 104 over network 109 and retrieve the set of filter responses (e.g., filter responses 105) based on a context variable. A context variable may be a data structure that stores state information (e.g., items added to a shopping cart in an online store) or records user activity (e.g., clicking of particular buttons, logging in, or recording which information screen of application 103 was viewed by a user in the past). A context variable may store arbitrary pieces of information that a user previously entered into form fields such as names, addresses, passwords, and credit card numbers. A context variable may be stored on client device 106 (e.g., a cookie for a web browser). A context variable may be stored on server 102.

AI engine 110 can generate the set of filter responses for UI adaptor 108 in response to receiving the request for the set of filter responses from UI adaptor 108. For example, AI engine 110 can generate the set of filter responses based on a context variable (e.g., provided by UI adapter 108). AI engine 110 can further generate the set of filter responses based on the current user. For example, AI engine 110 can generate a set of filter responses based on the user's profile matching different user segments having corresponding sets of filter responses.

Server 102 can identify the current user based on facial recognition. For example, server 102 can identify the current user by comparing facial features of the user operating client device 106 to stored facial features associated with known users. Client device 106 can capture the facial features of the operating user. For example, client device 106 can capture the facial features of the operating user using a camera communicatively coupled to client device 106. Server 102 can receive the captured facial features of the user from client device 106. As would be appreciated by a person of ordinary skill in the art, server 102 can identify the current user using various other techniques.

AI engine 110 can further generate the set of filter responses based on various other criteria provided by UI adaptor 108 as would be appreciated by a person of ordinary skill in the art.

UI adaptor 108 may select a different set of filter responses from data store 104 (e.g., previously generated by AI engine 110) based on information stored in a context variable. For example, UI adaptor 108 may retrieve a different set of filter responses from data store 104 by comparing the information stored in the context variable to the filter responses and or filter response metadata in data store 104. For example, UI adaptor 108 may retrieve a different set of filter responses for an online shopping website depending on the type of credit card a user used during checkout. UI adaptor 108 may also retrieve a different set of filter responses based on what websites a user previously visited or whether the user is logged in. As would be appreciated by a person of ordinary skill in the art, UI adaptor 108 may retrieve a different set of responses based on various other types of information stored in a context variable.

In some embodiments, UI adaptor 108 generates a set of UI elements for each response in the set of filter responses in data source 104. For example, UI adaptor 108 may generate three buttons for three filter responses. Specifically, a button labeled "Filter 1" may be generated from a filter response of "Search string 1." A button labeled "Filter 2" may be generated from a filter response of "Search string 2." Finally, a button labeled "Filter 3" may be generated from a filter response of "Search string 3."

In some embodiments, the set of filter responses in data source 104 may represent entity specific filter responses. Thus, for example, one business may enable filtering on a different set of filter responses than another business.

For example, an online shopping website may capture the following set of filter responses from data source 104: "price less than $24," "Zinfandel," and "1996." UI adaptor 108 may then generate a new set of UI elements from an existing "Return to Search Results" button. For example, UI adaptor 108 may generate a "Return to search results (Less than $24)" button, a "Return to search results (Zinfandel)" button, and a "Return to search results (1996)" button. The three buttons may perform the same action as the "Return to Search Results" button, e.g., returning to a user's previous search results. But the three buttons may also perform additional user filtering when clicked. In other words, each of the three buttons perform two actions (e.g., a return to search results request and filtering the search results the user is interested in) for a single click. This enables the transmission of more information per click, per visitor, or per minute to the website. In addition, the three buttons may reduce additional network requests because it is unnecessary to perform a separate network transmission with filtering information (e.g., what subset of the search results the user is interested in after submitting the return to search results request).

In some embodiments, UI adaptor 108 may be disabled from reading the UI code in order to prevent UI adaptor 108 from generating UI elements that perform filtering from identified UI element codes with added parameter data structures. In some other embodiments, UI adaptor 108 may be configured to ignore UI element codes with added parameter data structures. As a result, UI adaptor 108 may not generate any UI elements that perform filtering from identified UI element codes. This can cause the generation of a UI element for the identified UI element code that performs the associated action of the UI element code but does not perform filtering (e.g., return to the search results without filtering). An administrator or other user can toggle whether UI adaptor 108 is disabled from reading UI element codes to prevent UI adaptor 108 from generating corresponding UI elements that perform filtering. An administrator or other user can also toggle whether UI adaptor 108 ignores UI element codes with added parameter data structures.

In some embodiments, UI adaptor 108 may be partially disabled from generating UI elements that perform filtering from identified UI element codes. For example, an entity may choose to not include filter responses for a particular UI element code in data source 104. UI adaptor 108 may then be configured to skip generating a UI element that performs filtering for the particular UI element code based on the lack of an associated filter response in data source 104. Instead, client device 106 (or server 102) may have already generated a traditional UI element that does not perform filtering. As a result, the traditional UI element may maintain the capability of performing the associated action of the UI element code but not performing user filtering. An administrator or other user can toggle whether UI adaptor 108 is partially disabled from generating UI elements that perform filtering from identified UI element codes.

Figure 2:
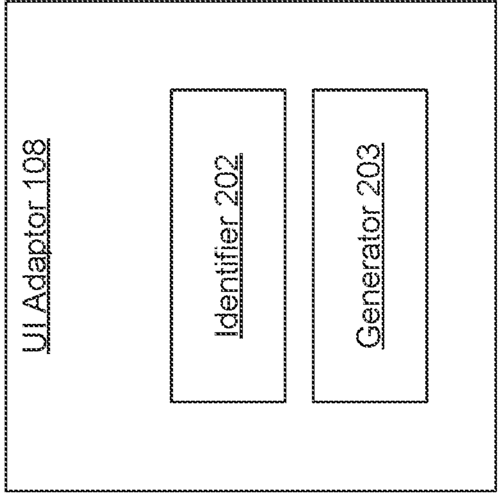
FIG. 2 is a block diagram of a UI adaptor for processing a UI to enable filtering of information screens based on one or more parameters, according to some embodiments.

FIG. 2 is a block diagram of UI adaptor 108 for processing a UI to enable filtering of an information screen based on one or more parameters, according to some embodiments. In some embodiments, UI adaptor 108 may be stored on server 102. UI adaptor 108 may be a part of a server program that handles information screen requests from client 106, e.g., web server software. UI adaptor 108 may also be a separate program that interacts with the server program that handles information screen requests from client 106. UI adaptor 108 may be executed to process UI code for an information screen in response to the server program receiving a request for the information screen from client 106. UI adaptor 108 may then generate a set of UI elements that perform filtering for an information screen. UI adaptor 108 may then transmit the generated set of UI elements to the server program for delivery to client 106.

In some other embodiments, UI adaptor 108 may be stored on client 106. UI adaptor 108 may be a separate program (e.g., a software plugin or extension) that interacts with viewer application 107 to present a generated set of UI elements that perform filtering. UI adaptor 108 may also be a part of viewer application 107.

In some embodiments, UI adaptor 108 may be executed in response to viewer application 107 receiving UI code for an information screen from server 102. UI adaptor 108 may then generate a set of UI elements that perform filtering of an information screen. UI adaptor 108 may then provide the generated set of UI elements to viewer application 107 for presentation.

In some embodiments, where UI adaptor 108 is a separate program, viewer application 107 may prompt a user at client device 106 to download and install UI adaptor 108 in response to receiving the UI code. Viewer application 107 may prompt the user based on metadata in the UI code which indicates that the UI code is to be processed by UI adaptor 108. As would be appreciated by a person of ordinary skill in the art, the viewer application 107 may prompt the user using various other mechanisms.

In some embodiments, UI adaptor 108 may be implemented in PUP: Hypertext Preprocessor (PUP), Java, Python, JavaScript, Visual Basic, or various other types of programming languages as would be appreciated by a person of ordinary skill in the art. In some other embodiments, UI adaptor 108 may be an extension for viewer application 107. For example, UI adaptor 108 may be a browser extension for Microsoft Internet Explorer®, Microsoft Edge®, Mozilla Firefox®, Apple Safari®, or Google Chrome® web browsers. UI adaptor 108 may be a mobile application such as, but not limited to, an Apple iOS app, a Google Android app, or various other mobile application types as would be appreciated by a person of ordinary skill in the art.

In some other embodiments, UI adaptor 108 may be a standalone plugin. This can provide several technical benefits. First, this can increase stability. A developer can implement UI adaptor 108 without modifying (or even having access to) application 103 or viewer 107. This can decrease the chance of introducing bugs into application 103 or viewer 107. Second, this can improve compatibility across different devices. A developer can implement different versions of UI adaptor 108 optimized for different devices or use cases. Third, this can improve code reuse. A developer can implement UI adaptor 108 once and reuse it multiple times. Finally, this can increase integration opportunities. For example, third-party developers can easily extend application 103 or viewer 107 with new features and functionality.

In some embodiments, where UI adaptor 108 is implemented as a standalone plugin, application 103 and or viewer 107 can provide various services that UI adaptor 108 can use. For example, application 103 can provide a way for UI adaptor 108 to register itself with application 103. Application 103 can also provide a protocol for the exchange of data with UI adaptor 108. This can enable application 103 to operate independently of UI adaptor 108. This can allow third-party developers to add or update UI adaptor 108 without needing to make changes to either application 103 or viewer 107.

In some embodiments, UI adaptor 108 can be implemented as a standalone plugin using various approaches. UI adaptor 108 can be implemented using one or more shared libraries. These shared libraries can be dynamically loaded at runtime. This can allow UI adaptor 108 to become a self-contained application in its own right. This can enable UI adaptor 108 to be distributable as a single entity that end-users can run without the need for additional installation steps.

For example, UI adaptor 108 can be implemented as a standalone plugin using various software frameworks. For example, UI adaptor 108 can be implemented as a Microsoft ActiveX® control, an Oracle Java® applet, a Netscape Plugin Application Programming Interface (NPAPI) plugin, or various other type of plugin as would be appreciated as a person of ordinary skill in the art. UI In some embodiments, UI adaptor 108 can also be implemented by loading a directory of simple script files written in a scripting language. For example, UI adaptor 108 can be implemented by loading script files written in Python, Perl, JavaScript, or various other types of scripting languages as would be appreciated by a person of ordinary skill in the art.

In some embodiments, UI adaptor 108 may include identifier 202 and generator 203. Identifier 202 may identify one or more UI element codes in a UI code for an information screen of application 103 from which to generate UI elements that perform user filtering. Specifically, identifier 202 may search the UI code for a parameter data structure linked to a UI element code. For example, identifier 202 may identify a UI element code by searching for a parameter data structure linked to a UI element code in a hypertext markup language (HTML) file describing a web page for application 103. As would be appreciated by a person of ordinary skill in the art, identifier 202 may identify a UI element code from which to generate a set of UI elements that perform filtering using various other mechanisms.

In some embodiments, a parameter data structure may be a unique numerical identifier. In some other embodiments, a parameter data structure may be a compound data structure including several fields. For example, the parameter data structure may include a numerical identifier field and a UI element type field. As would be appreciated by a person of ordinary skill in the art, a parameter data structure may include various other fields.

In some embodiments, the numerical identifier field may be a unique numerical identifier linked to a UI element code. The UI element type field may indicate a type of UI element to generate. For example, in some embodiments, the UI element type field may be set to "button" to generate a set of button UI elements. In some other embodiments, the UI element type field may be set to "combo box" to generate one or more combo box UI elements. As would be appreciated by a person of ordinary skill in the art, the UI element type field may be set to various other values to generate various other types of UI elements.

In some embodiments, an agent may link a parameter data structure to a UI element code by modifying the UI code (e.g., a markup file) that presents an information screen for application 103. For example, an agent may link a parameter data structure to a UI element code by modifying a hypertext markup language (HTML) document describing a web page for application 103. As would be appreciated by a person of ordinary skill in the art, an agent may link a parameter data structure to a UI element in an information screen for application 103 using various other mechanisms.

In some embodiments, an agent may specify a parameter data structure using a reserved attribute field linked to the UI element code. For example, the UI element code may be a HTML button tag and the parameter data structure may be a "name" attribute field. The "name" attribute field may be a reserved attribute field in the HTML standard. The UI element code may be linked to the parameter data structure using the following format: <button name="ui-filter" type="button">Click Me!</button>. By using a reserved attribute field, viewer application 107 may be able to still present an information screen (without generated UI elements that perform filtering) when UI adaptor 103 is not installed on, or being used by, a client device. Viewer application 107 may simply ignore the "name" attribute field. This can ensure backward compatibility with client devices that do not have UI adaptor 103 installed. On the other hand, if UI adaptor 103 is installed and being used by a client device, UI adaptor 103 may generate a set of UI elements that perform filtering based on the "name" attribute field (e.g., the parameter data structure) being set to "ui-filter."

In some other embodiments, an agent may specify a parameter data structure using a new attribute field linked to the UI element code. For example, the UI element code may be a HTML button tag and the parameter data structure may be a HTML data attribute such as "data-ui-filter." The UI element code may be linked to the parameter data structure using the following format: <button data-ui-filter="1" type="button">Click Me!</button>. An agent may find a HTML data attribute to be more flexible than a reserved HTML attribute because the HTML data attribute may have no usage rules or value restrictions. Moreover, if UI adaptor 103 is installed and executing on server 102, a HTML data attribute can be used to generate UI elements that perform filtering while preserving backward compatibility at different client devices. This is because UI adaptor 103 may generate the UI elements that perform filtering at server 102 before they are received at client device 106.

In some embodiments, identifier 202 may present the identified set of UI element codes to generator 203. Generator 203 may then generate a set of UI elements for the identified UI element codes in an information screen for application 103.

In some embodiments, generator 203 may generate the set of UI elements based on a set of filter responses (e.g., filter responses 105) stored in data store 104. For example, generator 203 may request a set of filter responses from data store 104 over network 109. Generator 203 may request the set of filter responses from data store 104 based on the parameter data structure linked to the identified UI element code. However, as would be appreciated by a person of ordinary skill in the art, generator 203 may request the set of filter responses from data store 104 based on various other mechanisms.

In some embodiments, generator 203 may generate a UI element for each filter response in the set of filter responses associated with the identified UI element code. Generator 203 may generate a UI element such that the UI element performs the same action as the identified UI element code normally would perform but also performs filtering associated with the generated UI element.

For example, generator 203 may generate UI elements A, B, and C for a UI element code <button name="Z">Z</button>. Generator 203 may configure UI elements A, B, and C to perform the same action as a traditional UI element generated from UI element code <button name="Z">Z</button> would perform, e.g., executing a return to search results script named script.php at server 102.

In some embodiments, generator 203 may also configure UI elements (e.g., UI elements A, B, and C) to perform filtering using their associated filter responses from data store 104. For example, UI element A may be associated with the filter response "Less than $24." UI element B may be associated with the filter response "Zinfandel." UI element C may be associated with the filter response "1996." Generator 203 may configure UI element A to execute script.php and perform filtering using the filter response "Less than $24" when a user performs the action associated with UI element A. Similarly, generator 203 may configure UI element B to execute script.php and perform filtering using the filter response "Zinfandel." Finally, generator 203 may configure UI element C to execute script.php and perform filtering using the filter response "1996."

In some embodiments, generator 203 may configure a UI element to perform an action and perform filtering using a filter response using a Hypertext Transfer Protocol (HTTP) GET request. For example, generator 203 may configure UI element A to execute script.php and perform filtering using the response "Less than $24" by issuing the GET request script.php?filter="Less than $24" to server 102. As would be appreciated by a person of ordinary skill in the art, generator 203 may configure a UI element to perform filtering using a filter response using various other mechanisms (e.g., an HTTP POST request, JavaScript, Java, or PUP).

A data source (e.g., server 102, data store 104, or another data source) may process a filter response. For example, a DBMS storing a product catalog may process a filter response executed because of a user triggering an action of a UI element generated and configured by generator 203. For example, the user may trigger the action of the UI element via a mouse click, finger tap, eye movement, body gesture, or other type of user interaction as would be appreciated by a person of ordinary skill in the art. The DBMS may select a subset of data in the product catalog based on the filter response. In other words, the DBMS may select a subset of data in the product catalog that matches the filter response. To perform such filtering using the filter response, the DBMS may require that the filter response satisfy its input format. For example, if the DBMS executes queries using structured query language (SQL), the filter response may need to satisfy the input format of SQL. Moreover, the filter response may also need to satisfy the input format of the mechanism used to transfer the filter response to the data source (e.g., a HTTP GET request).

In some embodiments, generator 203 may convert the filter response to an input format that satisfies the data source that processes the filter response. For example, generator 203 may convert the filter response of "Less than $24" to "price<24."

In some embodiments, generator 203 may encode the filter response to an input format that satisfies the input format of the mechanism used to transfer the filter response to the data source. Generator 204 may encode the filter response after converting the filter response to an input format that satisfies the data source that processes the filter response. For example, generator 203 may encode the converted filter response "price<24" to "price<24" for an HTTP GET request.

In some embodiments, generator 203 may generate the set of UI elements in a particular order based on an order of the set of filter responses from data store 104. For example, generator 203 may generate the set of UI elements based on a numerical ordering associated with the set of filter responses. For another example, generator 203 may generate the set of UI elements based numerical weights associated with each filter response in set of the filter responses. Generator 203 may generate the set of UI elements in a particular order based on various other types of criteria as would be appreciated by a person of ordinary skill in the art.

In some embodiments, generator 203 may avoid generating a UI element for a filter response in the set of filter responses. For example, generator 203 may avoid generating a UI element for a filter response having an associated weight value below (or above) a threshold weight value. For another example, generator 203 may avoid generating a UI element for a filter response having an associated low frequency of use. Generator 203 may avoid generating a UI element for a filter response in the set of filter responses based on various other types of criteria as would be appreciated by a person of ordinary skill in the art.

In some embodiments, a set of filter responses in data source 104 may be stored in a database table. A filter response in the set of filter responses may be assigned an identifier that corresponds to a parameter data structure linked to a UI element in an information screen of application 103. A filter response in the set of filter responses may also be assigned a category that indicates a type of filter response. A filter response in the set of filter responses may also be assigned a weight that indicates a level of importance of the filter response. A filter response in the set of filter responses may also be assigned an ordinal number that indicates the ordinal position of the filter response in the set of filter responses. A filter response in the set of responses may be assigned various other characteristics as would be appreciated by a person of ordinary skill in the art.

In some embodiments, AI engine 110 can use one or more characteristics assigned to filter responses to select a subset of filter responses for use by UI adaptor 108. AI engine 110 can also use one or more characteristics assigned to filter responses to merge different sets of filter responses corresponding to different user segments. AI engine 110 can then provide this merged set of filter responses for use by UI adaptor 108.

In some embodiments, UI adaptor 108 can use one or more characteristics assigned to filter responses to select a subset set of filter responses from data source 104. UI adaptor 108 can also use one or more characteristics assigned to filter responses to order filter responses in the set of filter responses from data source 104. UI adaptor 108 can then generate and configure a set of UI elements based on the set of filter responses and the order of the set of filter responses.

In addition to selecting an appropriate set of filter responses, the particular presentation of an information screen with generated UI elements based on the set of filter responses is also important to soliciting user engagement. Different websites or software applications may not only be visibly different, but the user demographics associated with different websites or software applications (e.g., the users using the website or software application) may also be unique. User engagement and user satisfaction often depends on how an information screen is presented to users. However, entities are often unsure of the best way to present such information screens to users. Moreover, it can be cumbersome and error prone for an administrator to change various user interface attributes or filter responses manually. Moreover, it can be difficult to ensure that every combination of variables was tried, let alone with the same users. Finally, it can be difficult to ensure that different combinations were evaluated according to objective criteria rather than subjective opinion of the administrator.

In some embodiments, to solve these technological problems, server 102 can perform multivariant testing (e.g., A/B testing) for each information screen generated by UI adaptor 108. Server 102 can perform the multivariant testing using AI engine 110. Server 102 can also perform the multivariant testing using a separate module on server 102 as would be appreciated by a person of ordinary skill in the art. Server 102 can perform the multivariant testing to determine which one or more variations of the information screen generated by UI adaptor 108 performs the best out of all the possible combinations.

Server 102 can also determine which combination of filter responses 105 performs the best out of all the possible combinations. For example, AI engine 110 can determine which set of filter responses for a particular user segment performs the best out of all the possible sets of filter responses for the particular user segment.

Server 102 can also determine which combination of user interface design attributes performs the best out of all the possible combinations. For example, server 102 can determine what layout of user interface elements (e.g., position, order, size, etc.) on the information screen performs the best out of all the possible combinations. For another example, Server 102 can determine what formatting (e.g., font, color, background, etc.) on the information screen performs the best out of all the possible combinations. For another example, Server 102 can determine what type of user interface elements (e.g., drop down menu, list box, combo box, etc.) on the information screen performs the best out of all the possible combinations. As would be appreciated by a person of ordinary skill in art, server 102 can determine which combination of other types of user interface design attributes performs the best out of all the possible combinations. Moreover, as would be appreciated by a person of ordinary skill in art, server 102 can also determine which combination of filter responses and user interface design attributes performs the best out of all the possible combinations.

Server 102 can determine which one or more variations of the information screen generated by UI adaptor 108 performs the best out of all the possible combinations by testing different variations with a large number of users over a fixed period of time. For example, AI engine 110 can test the different variations over one hundred users over one week.

Server 102 can select a large enough number of users such that the testing will generate statistically significant results. Server 102 can further select a long enough period of time such that the testing will generate statistically significant results.

To determine what one or more variations among all the possible combinations performs the best, server 102 can calculate a score for each variation based on various criteria. For example, server 102 can evaluate how long a user stayed on the information screen. Server 102 can evaluate how often a user interacted with particular UI elements on the information screen. Server 102 can evaluate what action the user took on the information screen. Server 102 can evaluate various other types of criteria (e.g., customer lifetime value, order value, etc.) as would be appreciated by a person of ordinary skill in the art.

In some embodiments, server 102 can calculate a score for each variation based on criteria received from client device 106 (e.g., from viewer application 107 or UI adaptor 108). In some other embodiments, server 102 can calculate a score for each variation based on criteria collected at server 102 (e.g., in AI engine 110 or application 106). In some other embodiments, server 102 can calculate a score for each variation based on criteria received from various other data sources as would be appreciated by a person of ordinary skill in the art.

In some embodiments, after calculating a score for each variation, server 102 can determine the best performing variation as the variation having the highest (or lowest) score among all the variations. Server 102 can then select the best performing variation for use going forward (e.g., by a particular user or user segment). For example, server 102 can provide the best performing set of filter responses to UI adaptor 108. UI adaptor 108 can then generate and configure a set of UI elements for filtering based on the set of filter responses. For another example, server 102 can provide the best performing set of filter responses and associated user interface design attributes to UI adaptor 108. UI adaptor 108 can then generate and configure a set of UI elements for filtering based on the set of filter responses and the associated user interface design attributes. For example, UI adaptor 108 can change the position, order, size, font, color, background, and or type of the set of UI elements configured to filter based on the set of filter responses.

As would be appreciated by a person of ordinary skill in the art, UI adaptor 108 can receive different variations of user interface attributes from AI engine 110 using various mechanisms. For example, UI adaptor 108 can receive different variations of user interface attributes using cascading style sheets (CSS).

FIG. 3A shows an example set of filter responses 300 for a system that processes UI code to enable filtering of an information screen based on one or more parameters, according to some embodiments. For example, set of filter responses 300 may be for an online wine store application. In some embodiments, an agent of a business, organization, or government entity may insert, modify, or delete one or more filter responses from set of filter responses 300. In some other embodiments, AI engine 110 may generate set of filter responses 300 as discussed above.

In the example of FIG. 3A, set of filter responses 300 is a table with the following columns: ID 302, category 304, filter response 306, and weight 308. However, filter responses 300 may implemented using various other columns and data structures as would be appreciated by a person of ordinary skill in the art.

In the example of FIG. 3A, a filter response is represented as a row in set of filter responses 300. A filter response in set of filter responses 300 contains four pieces of information: an ID 302, a category 304, a filter response 306, and a weight 308. ID 302 may store a unique numerical identifier associated with a parameter data structure linked to a UI element in an information screen for application 103. Category 304 may store a type of filter response for a UI element. For example, in FIG. 3A, there are two categories of response: "General" and "Preferred." The "General" category may represent filter responses for normal customers and the "Preferred" category may represent filter responses for preferred customers. The filter response 306 may store the actual filter response to be used to generate a UI element in the set of UI elements that filters an information screen. Filter response 306 may be a query, search string, regular expression, image, sound, or other type of data as would be appreciated by a person of ordinary skill in the art. Finally, weight 308 may store a numerical weight for a filter response. Weight 308 may control whether AI engine 110 selects the filter response for use by UI adaptor 108. Weight 308 may also control whether UI adaptor 108 generates a set of UI elements for the corresponding filter response. Weight 308 may also control the order that UI adaptor 108 generates a set of UI elements for the filter responses. In some embodiments, weight 308 is defined by AI engine 110. In some other embodiments, server 102 (e.g., in AI engine 110) generates weight 308 based on historical activity (e.g., filtering selections) by one or more users.

FIG. 3B shows another example set of filter responses 320 for a system that processes UI code to enable filtering of an information screen based on one or more parameter data structures, according to some embodiments. Set of filter responses 320 can be a filter response table manually generated by an agent of a business, organization, or government entity. Set of filter responses 320 can also be a dynamic filter response table generated by AI engine 110. Set of filter responses 320 can also be a filter response table culled by UI adaptor 108.

In the example of FIG. 3B, set of filter responses 320 is a table with the following columns: ID 322, filter response 324, and widget tag ID 326. However, set of filter responses 320 may implemented using various other columns and data structures as would be appreciated by a person of ordinary skill in the art.

In the example of FIG. 3B, a filter response is represented as a row in set of filter responses 320. A filter response in set of filter responses 320 has a unique ID (e.g., ID 322) and a filter response (e.g., filter response 324). Filter response 324 may be a query, search string, regular expression, image, sound, or other type of data as would be appreciated by a person of ordinary skill in the art.

In the example of FIG. 3B, a filter response in set of filter responses 320 is also associated with a widget tag 332 in the table widget tags 328. A widget tag 332 may represent a category or class of filter responses such that any UI element associated with a given widget tag 332 may be modified (or decorated) with an identical set of filter responses from filter responses 320.

In the example of FIG. 3B, a filter response in set of filter responses 320 is associated with widget tag 332 via widget tag ID 326 (e.g., a foreign key reference). In other words, a widget tag ID 326 contains a reference to an ID 330 in widget tags 328. An ID 330 in widget tags 328 is a numerical identifier that uniquely identifies a widget tag 332 in widget tags 328. A widget tag 332 may be a text string, a color, an image, a sound, a video, or various other types of response content as would be appreciated by a person of ordinary skill in the art.

In some embodiments, with respect to the example of FIG. 3B, a UI element in an information screen (e.g., an HTML element) may be associated with one or more parameter data structures that references set of filter responses 320 and widget tags 328. For example, an HTML element may contain the following HTML 5 data attributes: data-ii-widgetTag and data-ii-widgetID. data-ii-widgetTag may contain a value of a widget tag 332 in widget tags 328 (e.g., “price”). An HTML element may be modified (or decorated) with one or more filter responses 324 in set of filter responses 320 based on a value of its data-ii-widgetTag attribute. For example, an HTML element may decorated with the filter responses 324 of “Less than $24,” “Around $24,” and “Greater than $24” when its data-ii-widgetTag attribute is set to “price”.

In some embodiments, multiple UI elements (e.g., HTML elements) may have the same parameter data structure value (e.g., the same value for their data-ii-widgetTag attributes). These UI elements (e.g., HTML elements) will therefore be decorated with the same filter responses 324 in set of filter responses 320.

In some embodiments, the data-ii-widgetID data attribute of an HTML element may uniquely identify the HTML element. As a result, when a filter response 324 is applied by an HTML element, the value of data-ii-widgetID data attribute can be used to determine the exact HTML element that applied the filter response 324.

In some embodiments, a combination of the data-ii-widgetID and data-ii-widgetTag attributes may be used to decorate a HTML element with a set of filter responses 324. For example, in some embodiments, the data-ii-widgetID and data-ii-widgetTag attributes may each define a set of filter responses 324 for an HTML element. In some embodiments, one or more filter responses 324 for the HTML element may be determined by taking the intersection of the one or more filter responses 324 associated with its data-ii-widgetID data attribute and one or more filter responses 324 associated with its data-ii-widgetTag data attribute. In some other embodiments, one or more filter responses 324 for the HTML element may be determined by taking the union of the one or more filter responses 324 associated with its data-ii-widgetID data attribute and the one or more filter responses 324 associated with its data-ii-widgetTag data attribute.

As would be appreciated by a person of ordinary skill in the art, various other combinations of the data-ii-widgetID and data-ii-widgetTag attributes may be used to decorate an HTML element with one or more filter responses 324. Moreover, as would be appreciated by a person of ordinary skill in the art, various numbers, types, and names of parameter data structures (e.g., HTML 5 data attributes) for various types of UI elements may be used alone or in combination to determine a set of responses.

In some embodiments, generator 203 may generate a set of UI elements by looking up a parameter data structure linked to a UI element code in the set of filter responses. In some other embodiments, generator 203 may look up a parameter data structure linked to a UI element code and a category in the set of filter responses. The operation of generator 203 is described with reference to FIGS. 3A-8.

FIG. 3C shows an example set of filter responses 350 for a system that processes UI code to enable filtering of an information screen based on one or more parameters, according to some embodiments. For example, the set of filter responses 350 may be for an online wine store application.

In the example of FIG. 3C, set of filter responses 350 includes the following columns: ID 352, filter response 354, and weight 356. However, set of filter responses 350 may implemented using various other columns and data structures as would be appreciated by a person of ordinary skill in the art.

In the example of FIG. 3C, a filter response is represented as a row in set of filter responses 350. A filter response in set of filter responses 350 contains three pieces of information: an ID 352, a filter response 354, and a weight 356. ID 352 may store a unique numerical identifier associated with a parameter data structure linked to a UI element in an information screen for application 103. The filter response 354 may store the actual filter response to be used to generate a UI element in the set of UI elements that filters an information screen. Filter response 354 may be a query, search string, regular expression, image, sound, or other type of data as would be appreciated by a person of ordinary skill in the art. Finally, weight 356 may store a numerical weight for a filter response. Weight 356 may control whether AI engine 110 selects the filter response for use by UI adaptor 108. Weight 356 may also control whether UI adaptor 108 generates a set of UI elements for the corresponding filter response. Weight 356 may also control the order in which UI adaptor 108 generates a set of UI elements for the filter responses.

In the example of FIG. 3C, AI engine 110 generates set of filter responses 350 based on two other sets of filter responses: 330 and 340. In some embodiments, an agent of a business, organization, or government entity may insert, modify, or delete one or more responses in sets of filter responses 330 and 340. In some other embodiments, AI engine 110 may generate sets of filter responses 330 and 340 as discussed above.

In some embodiments, AI engine 110 can select sets of filter responses 330 and 340 for generating set of filter responses 350 based on various criteria. For example, AI engine 110 can select set of filter responses 330 because its filter responses are applicable to general wine drinkers. Similarly, AI engine 110 can select set of filter responses 340 its filter responses are applicable to preferred customers. In other words, AI engine 110 can generate set of filter responses 350 based on multiple sets of filter responses representing different user segments.

In some embodiments, AI engine 110 can exclude filter responses in sets of filter responses 330 and 340 from the generated set of filter responses 350 based on various criteria as would be appreciated by a person of ordinary skill in the art. For example, AI engine 110 can exclude filter responses in sets of filter responses 330 or 340 from set of filter responses 350 because they are assigned a weight above or below a threshold weight value.

In some embodiments, AI engine 110 can order the filter responses in the set of filter responses 350 based on criteria such as, but limited to, most popular filter response, most recently applied filter response, sponsored filter response, or other criteria as would be appreciated by a person of ordinary skill in the art. For example, in FIG. 3C, AI engine 110 can order the filter responses from filter responses 330 or 340 in set of filter responses 350 based on weight (e.g., weight 336 and weight 346). Thus, the filter response "Less than $24" can be the first filter response in set of filter responses 350 because it has the lowest value weight.

FIG. 4 shows a portion of an example UI markup 400 for an information screen for application 103, according to some embodiments. In FIG. 4, example UI markup 400 is for an online wine store application and may be an HTML file. As would be appreciated by a person of ordinary skill, UI markup 400 may represent the information screen using PHP, JavaScript, Java or various other programming languages.

Figure 5:
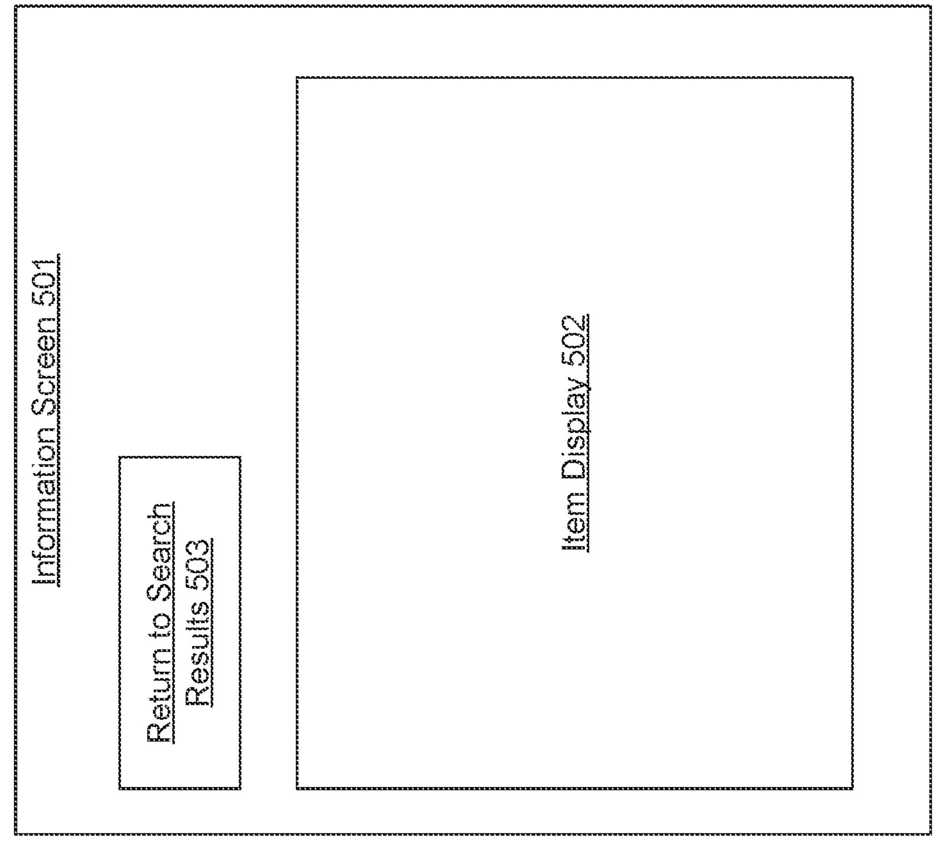
FIG. 5 is an example display of an information screen for an online wine store application without processing to enable filtering of another information screen based on one or more parameters, according to some embodiments.

FIG. 5 is an example display of an information screen for the online wine store application represented by UI markup 400 without processing to enable filtering of another information screen based on one or more parameters, according to some embodiments. In FIG. 5, viewer application 107 may display UI markup 400 as information screen 501 without processing by generator 203. Information screen 501 may be a web page. Information screen 501 may also be a UI screen for a desktop, laptop, tablet, or smartphone software application. Information screen 501 may also be a UI screen for a POS terminal.

In some embodiments, information screen 501 may include an item display 502 and a "Return to Search Results" button 503. Item display 502 may be a UI pane that displays a particular wine bottle's product details. "Return to Search Results" button 503 may be a UI button that returns to a list of search results that a user previously viewed. While FIG. 5 is used to show what the information screen 501 would look like if no customization were used, typically FIG. 5 would not be displayed if customized UI elements were available. Instead, an information screen such as that in FIG. 6 would be displayed.

FIG. 6 is an example display of the information screen for the online wine store application represented by UI markup 400 after processing to enable filtering of another information screen based on one or more parameters, according to some embodiments. In FIG. 6, viewer application 107 may display UI markup 400 as information screen 601 after processing by generator 203. Information screen 601 may be a web page similar to information screen 501. Information screen 601 may also be a UI screen for a desktop, laptop, tablet, or smartphone software application. Information screen 601 may also be a UI screen for a POS terminal.

In some embodiments, information screen 601 may include an item display 602. Item display 602 may be a UI pane that displays a particular wine bottle's product details similar to item display 502. Information screen 601 may also include a new set of UI elements 603.

In some embodiments, generator 203 may generate UI elements 603 based on set of filter responses 300. Specifically, identifier 202 may identify a parameter data structure (e.g., "id=1") linked to the UI element code that generates "Return to Search Results" button 503 in UI markup 400 for information screen 501.

In some embodiments, generator 203 may look up the parameter data structure (e.g., "id=1") linked to the UI element code that generates "Return to Search Results" button 503 in responses 300.

In some embodiments, generator 203 may retrieve a set of filter responses associated with the UI element code that generates "Return to Search Results" button 503 from set of filter responses 300. For example, generator 203 may receive the following filter responses 306 associated with the parameter data structure (e.g., "id=1") linked to the UI element code that generates "Return to Search Results" button 503 from data source 104: "Less than $24", "Around $24", "Greater than $24", "Zinfandel", "California", and "1996." In other some embodiments, if a user is logged in as a "Preferred" customer, generator 203 may receive the following filter responses: "Paul Doran Vineyards" and "Napa."

In some embodiments, generator 203 may generate UI elements 603-1, 603-2, 603-3, 603-4, 603-5, and 603-6 instead of "Return to Search Results" button 503 from the six filter responses "Less than $24", "Around $24", "Greater than $24", "Zinfandel", "California", and "1996." In other words, generator 203 may generate a UI element for each filter response 306.

In some other embodiments, generator 203 may generate UI elements 603 (e.g., 603-1 and 603-2) instead of "Return to Search Results" button 503 from the two filter responses "Paul Doran Vineyards" and "Napa" if a user is logged in as a "Preferred" customer. Specifically, generator 203 may retrieve the set of filter responses based on a context variable that stores information representing whether a user is logged in as a "Preferred" customer.

In some embodiments, generator 203 may generate UI elements 603-1, 603-2, 603-3, 603-4, 603-5, 603-6, 603-7, and 603-8 such that they perform the same action as "Return to Search Results" button 503. Generator 203 may also configure UI elements 603-1, 603-2, 603-3, 603-4, 603-5, and 603-6, 603-7, and 603-8 to apply their respective filter response to the information screen associated with the "Return to Search Results" button 503 when their UI action is performed.

Figure 7:
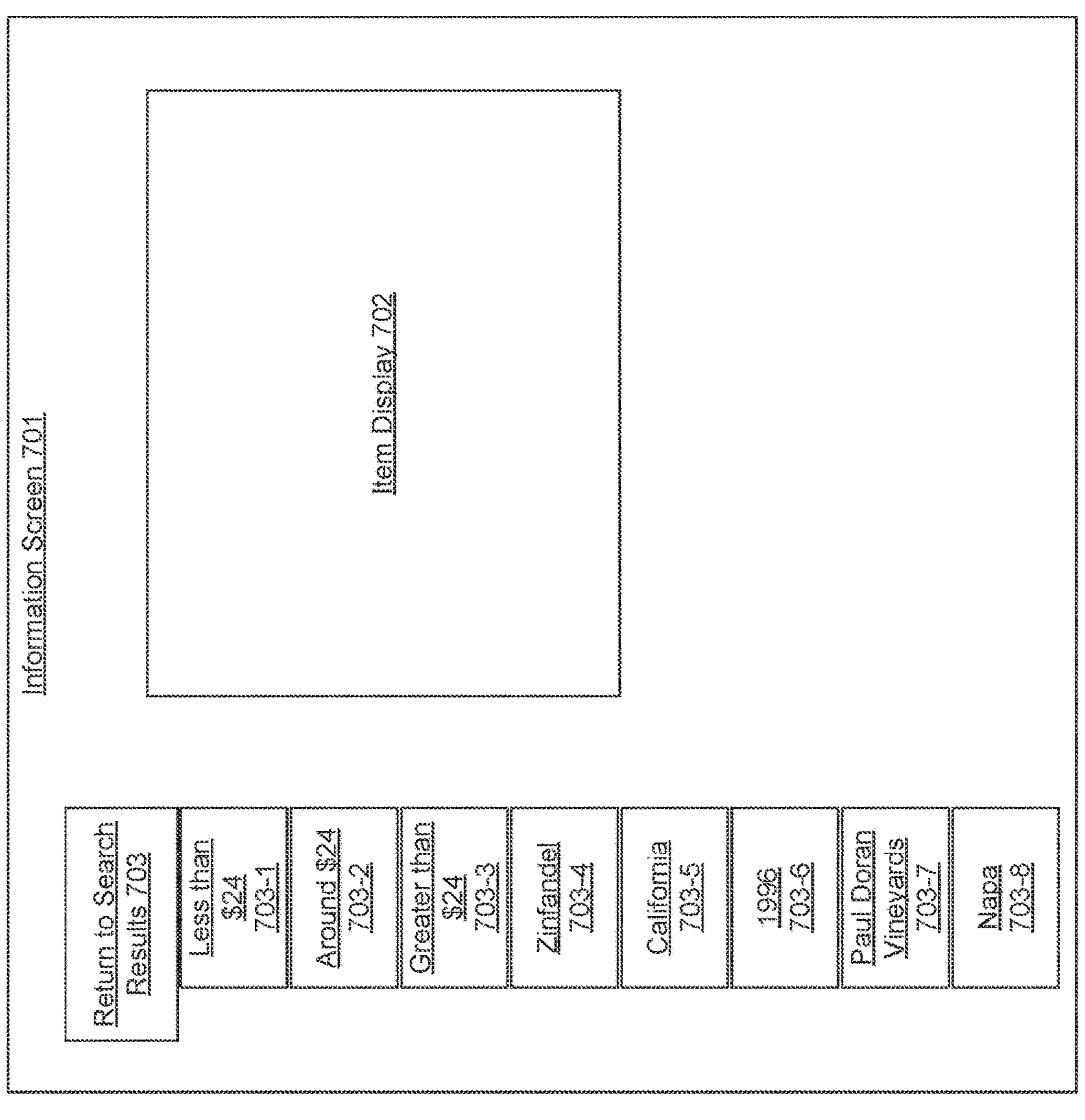
FIG. 7 is another example display of an information screen for an online wine store application after processing to enable filtering of another information screen based on one or more parameters, according to some embodiments.

FIG. 7 is another example display of an information screen for the online wine store application represented by UI markup 400 after processing to enable filtering of another information screen based on one or more parameters, according to some embodiments. In FIG. 7, viewer application 107 may display an information screen 701 after processing by generator 203. Information screen 701 may be a web page. Information screen 701 may also be a UI screen for a desktop, laptop, tablet, smartphone, or smart device software application. Information screen 701 may also be a UI screen for a POS terminal. Information screen 701 may also be include an item display 702 similar to item display 602 in information screen 601.

In some embodiments, generator 203 may generate UI elements 703 based on responses 300 for information screen 701. UI element 703 may apply the same set of filter responses as UI elements 603 in information screen 601. However, generator 203 may generate drop down menus for UI element 703 instead of the set of buttons for UI elements 603. In some embodiments, generator 203 may generate drop down menus for UI element 703 based on a UI element type field of a parameter data structure linked to the UI element code used to generate UI element 703. For example, generator 203 may generate a drop down menu when the UI element type field is set to 'button_type="menu"' in an HTML button tag, e.g., <button id="1" button_type="menu">Click me</button>. In some other embodiments, generator 203 may generate a hyperlink for UI element 703 that expands on a cursor hover to show the same responses as UI elements 603 in information screen 601. In some other embodiments, a response in UI element 703 may be selected by clicking a given filter response in the expanded list.

FIG. 8 shows another example display of an information screen for an application without processing, and the information screen after processing to enable filtering of another information screen based on one or more parameters, according to some embodiments. In FIG. 8, viewer application 107 may first display an information screen 801 without processing by generator 203.

In FIG. 8, viewer application 107 may then display an information screen 803 after processing by generator 203. Information screen 803 may include three new UI elements 804-1, 804-2, and 804-3 in information screen 803 that each create a message (e.g., create a new information screen and message editor when performed). In some embodiments, generator 203 may generate UI elements 804-1, 804-2, and 804-3 such that each performs the same action (e.g., create a message) as UI element 802, but also respectively filters the resulting information screen using different types of filter responses: for example, create a message that is pre-addressed to David, Derek, or Matt, depending on which option is selected by the user.

Figure 9:
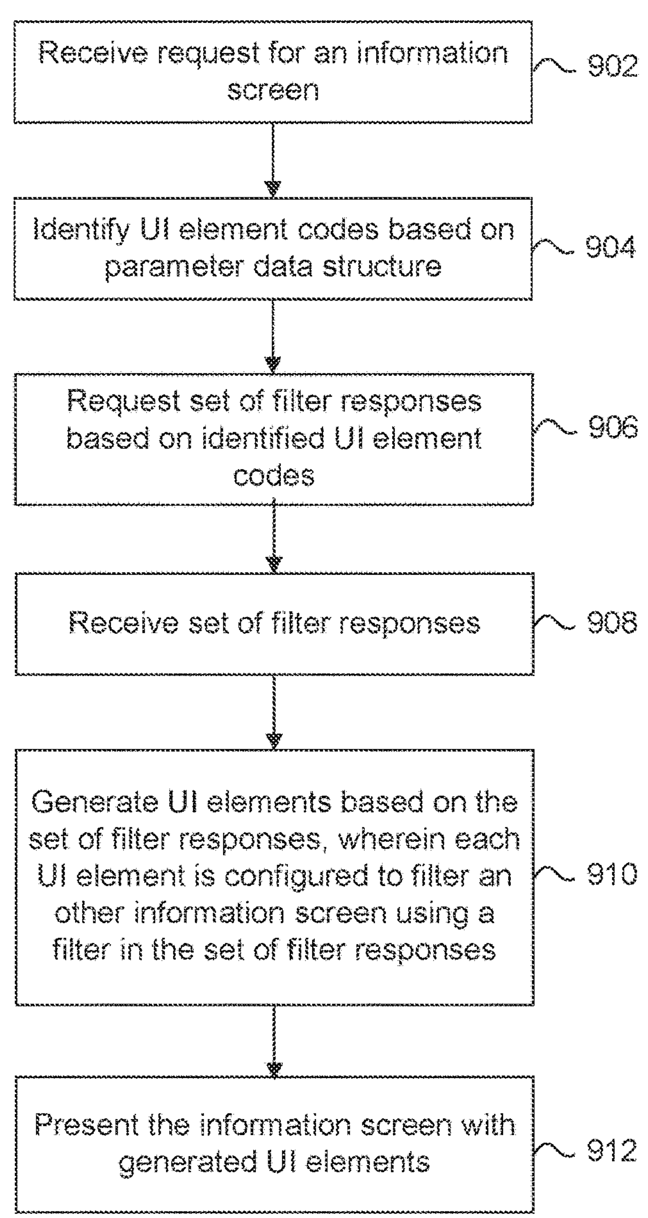
FIG. 9 is a flowchart illustrating a process for processing a UI to enable filtering of another information screen based on one or more parameters, according to some embodiments.

FIG. 9 is a flowchart for a method 900 for processing a UI code to enable filtering of an information screen based on one or more parameters, according to an embodiment. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as would be understood by a person of ordinary skill in the art.

Method 900 shall be described with reference to FIG. 1. However, method 900 is not limited to that example embodiment.

In 902, UI adaptor 108 receives a request for an information screen for application 103 from a client device 106.

In 904, UI adaptor 108 identifies one or more UI element codes in a UI code for the information screen for which to generate UI elements. In some embodiments, UI adaptor 109 may identify the one or more UI element codes by locating in the UI code one or more parameter data structures linked to the one or more UI element codes. In some embodiments, a parameter data structure may be a unique numerical identifier. In some other embodiments, a parameter data structure may be a compound data structure including several fields. In some embodiments, an agent may link a parameter data structure to a UI element code by modifying a markup file describing an information screen for the application. For example, an agent may modify a UI element code by including a unique numerical identifier representing a parameter data structure in an HTML tag associated with the UI element, e.g., <button id="1" type="button">Click me</button> where "id" is the parameter data structure that stores the unique numerical identifier.

In 906, UI adaptor 108 requests a set of filter responses for each identified UI element code from data source 104. In some embodiments, UI adaptor 108 may request a set of filter responses for an identified UI element code based on a parameter data structure linked to the identified UI element. In some embodiments, UI adaptor 108 may request the set of filter responses for the identified UI element code based on a category associated with the identified UI element code. In some embodiments, UI adaptor 108 may request the set of filter responses for the identified UI element code based on information in a context variable. In some embodiments, UI adaptor 108 may request the set of filter responses for the identified UI element code based on the current user. UI adaptor 108 may also request the set of filter responses for the identified UI element code profile based on various other types of criteria as would be appreciated by a person of ordinary skill in the art.

In some embodiments, UI adaptor 108 may request the set of filter responses for each identified UI element code in turn based on the parameter data structure linked to the identified UI element. In some other embodiments, UI adaptor 108 may request the set of filter responses for all identified UI element codes at once (e.g., via a single request) based on the parameter data structures linked to the identified UI elements.

In some embodiments, a context variable may be a data structure that stores state information (e.g., items added to a shopping cart in an online store) or records user activity (e.g., clicking of particular buttons, logging in, or recording which information screen of the application was viewed by a user in the past). In some embodiments, a context variable may be stored on client device 106 (e.g., a cookie for a web browser). In some other embodiments, a context variable may be stored on server 102.

In some embodiments, the set of filter responses may be provided by one or more entities (e.g., a business, organization, charity, government entity, or person providing content). In some embodiments, an agent of an entity may insert, update, or delete filter responses from the set of filter responses (e.g., filter responses 105) in data source 104.

In some other embodiments, the set of filter responses (e.g., filter responses 105) may be generated by AI engine 110. AI engine 110 can generate the set of filter responses from data provided by one or more entities (e.g., a business, organization, charity, government entity, or person providing content). AI engine 110 can select the set of filter responses from filter responses provided by the one or more entities. AI engine 110 can also learn a set of filter responses from data provided by the one or more entities. For example, AI engine 110 may apply machine learning to various wine trade publications. AI engine 110 may learn that wine region is an important criterion for wine drinkers. AI engine 110 may further learn that Bordeaux, Champagne, Burgundy, Napa Valley, and Sonoma are popular wine regions. AI engine 110 may therefore generate a set of filter responses that include these wine regions.

In some embodiments, AI engine 110 can generate a set of filter responses from across the one or more entities such that the set of filter responses are applicable to a particular user segment. For example, AI engine 110 can generate a set of filter responses from across different wine trade publications that are applicable to wine drinkers over the age of 50.

In some embodiments, AI engine 110 can generate a set of filter responses from across previously generated sets of filter responses. For example, AI engine 110 can generate a set of filter responses from the set of filter responses that are applicable to wine drinkers over the age of 50 and the set of filter responses that are applicable to female wine drinkers. In other words, AI engine 110 can generate a set of filter responses based on multiple sets of filter responses representing different user segments.

In some embodiments, AI engine 110 can order the filter responses in the set of filter responses based on criteria such as, but not limited to, most popular filter response, most recently applied filter response, sponsored filter response, or other criteria as would be appreciated by a person of ordinary skill in the art.

In some embodiments, AI engine 110 can exclude filter responses from the generated set of filter responses based on various criteria as would be appreciated by a person of ordinary skill in the art. For example, AI engine 110 can exclude filter responses assigned a weight above or below a threshold weight value.

In some embodiments, AI engine 110 can generate the set of filter responses prior to receiving a request from UI adaptor 108 for a set of filter responses. In some other embodiments, AI engine 110 can generate the set of filter responses in response to receiving a request from UI adaptor 108 for the set of filter responses. AI engine 110 can further generate the set of filter responses based on a context variable, user profile, or various other types of criteria provided by UI adaptor 108 as would be appreciated by a person of ordinary skill in the art.

In 908, UI adaptor 108 receives a set of filter responses for each identified UI element code from data source 104.

In 910, UI adaptor 108 generates one or more UI elements for each identified UI element code based on the set of filter responses received in 908. In some embodiments, UI adaptor 108 generates a UI element for each filter response in the set of filter responses received in 908. UI adaptor 108 may determine the type of UI element to generate based on a UI element type field in the parameter data structure linked to the identified UI element code.

In some embodiments, UI adaptor 108 may configure the one or more new UI elements to perform the same action as the corresponding identified UI element code. In some embodiments, UI adaptor 108 may configure the one or more new UI elements to filter another information screen (or the same information screen) using their associated filter responses. In other words, UI adaptor 108 may configure the one or more new UI elements to also perform a second action comprising updating the other information screen using their associated filter response. UI adaptor 108 may configure a UI element to filter the other information screen (or the same information screen) using its associated filter response using various mechanisms (e.g., a HTTP GET request, a HTTP POST request, JavaScript, Java, and PUP). In some embodiments, UI adaptor 108 may also configure a UI element to store the performed filter response in server 102 or data store 104.

In 912, UI adaptor 108 presents the information screen for application 103 on client device 106 using viewer application 107. In some embodiments, if UI adaptor 108 is located in server 102, UI adaptor 108 may transmit the information screen for application 103 to client device 106 for presentation by viewer application 107.

In some embodiments, UI adaptor 108 may request, generate, and configure the one or more UI elements at the time the information screen is loaded. In some other embodiments, UI adaptor 108 may perform one or more of the requesting, generating, and configuring of the one or more UI elements based on a user interaction with an already loaded information screen (e.g. tapping a UI element in the loaded information screen with an associated parameter data structure causes UI adaptor 108 to request, generate, and configure the one or more UI elements). In some other embodiments, UI adaptor 108 may perform one or more of the requesting, generating, and configuring of the one or more UI elements based on a characteristic of the device that UI adaptor 108 being executed on.

Often times an information screen includes one or more static UI elements. A static UI element can be a non-interactive UI element such as, but not limited to, text, an image, a symbol, video, audio, etc. A static UI element may not be configured to perform any action. A user may prefer to filter an information screen through these static UI elements. This is because these static UI elements often logically represent the type of filtering the user would like to perform. For example, a user may be interested in buying a bottle of wine from an online shopping website. The user interface may first load the website in the user's web browser. The user interface may then load a list of wine bottles available for purchase. The user may filter the list of bottles based on various criteria. Once the user finds a wine bottle of interest, the user may select that bottle, causing the user interface to display a product detail page about the bottle.

The product detail page may display the price, region, grape variety, and year of the bottle. It is often at this point, regardless of the filter options narrowing down the list of bottles displayed earlier on the page with the list of bottles, that the user determines which filter options are relevant to them. In other words, it may be that the user only realizes they want to filter on particular criteria after they have viewed the product detail page.

For example, while viewing the product detail page, the user may like the description of the region but think that the particular bottle is too expensive. Traditionally, the user may then click a "return to search results" button to go back to their search results. Having returned to the search results list, the user may then apply to the search results the filter criteria they learned from the just viewed bottle. The user may also apply particular criteria about the just viewed bottle to the search results. Thus, the shopping website forces the user to filter the list of bottles in the search results after leaving the product detail page.

This can require the user to remember all the criteria that they liked about the viewed bottle. In addition, it can require the client device to issue two requests to the server. First, the client device may issue a request for an information screen (e.g., "return to search results"). Second, the client device may issue a request to apply filter criteria to the information screen (e.g., the search results). However, the user would often prefer to click a descriptive attribute in the product detail page that returns to the search results and applies the descriptive attribute as a filter to the information screen (e.g., the search results).

Embodiments herein solve at least the technological problem of how to request and apply filter criteria to an information screen via a static UI element in a single request. Embodiments herein further solve at least the technological problem of how to customize a static UI element on a user interface to apply the filter criteria to an information screen without making changes to the underlying UI code. Embodiments herein further solve at least the technological problem of how to filter an information screen via a relevant static UI element using dynamically generated filter responses for different users and/or use cases.

In some embodiments, UI adaptor 108 solves the technological problem of how to request and apply filter criteria to an information screen via a static UI element in a single request. For example, UI adaptor 108 can solve this technological problem by dynamically associating the static UI element (e.g., text) in an information screen to stored filter responses. UI adaptor 108 can then generate a UI element for the static UI element that performs two actions in a single request. First, the generated UI element can request an information screen (e.g., search results). Second, the generated UI element can apply the associated filter response to the requested information screen. Alternatively, the generated UI element can apply one of a user selectable set of filter responses associated with the static UI element to the requested information screen.

FIG. 10 shows a portion of an example UI markup 1000 for an information screen for application 103, according to some embodiments. In FIG. 10, example UI markup 1000 is for an online wine store application and may be an HTML file. As would be appreciated by a person of ordinary skill, UI markup 1000 may represent the information screen using PHP, JavaScript, Java or various other programming languages.

Figure 11:
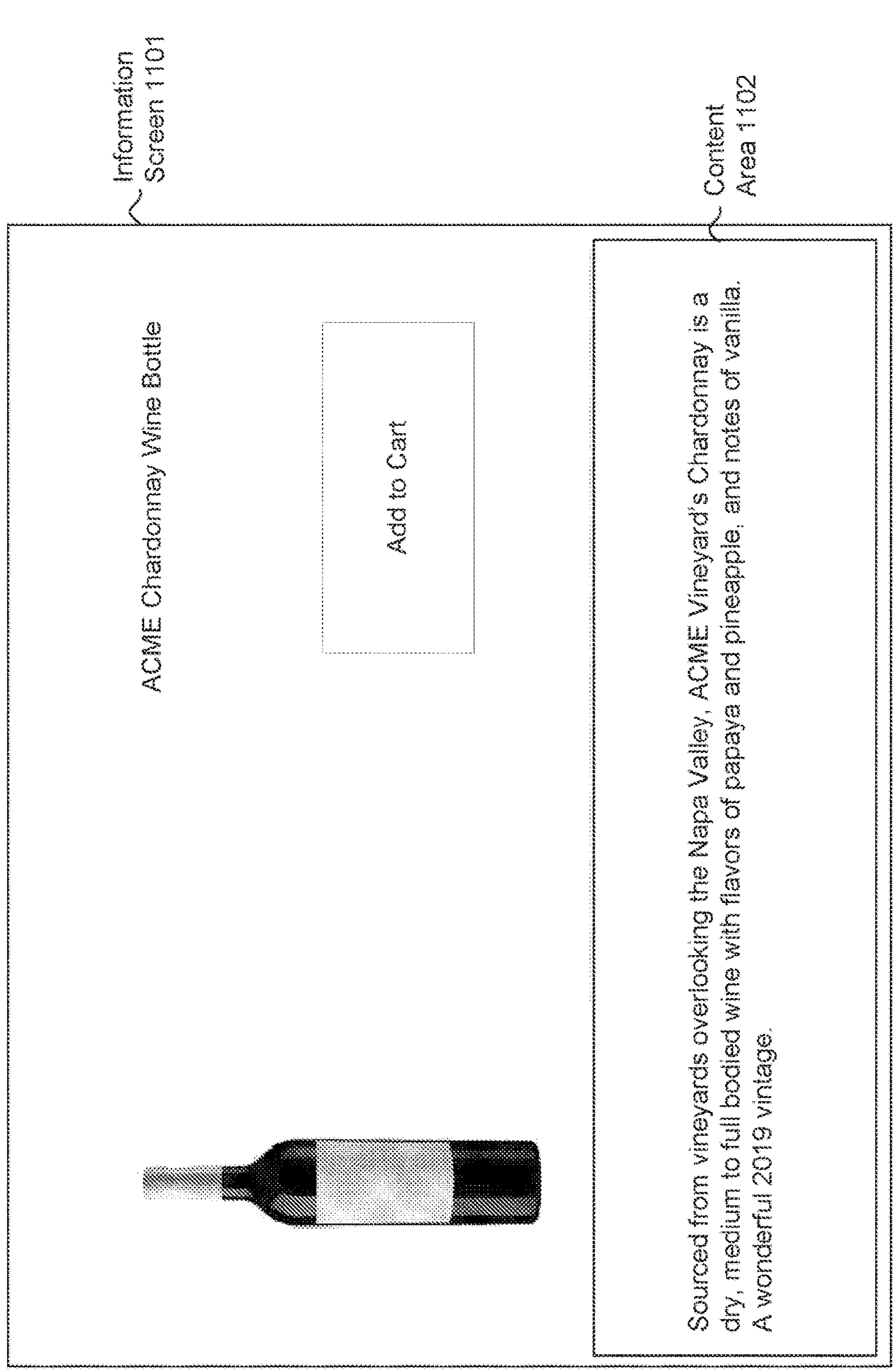
FIG. 11 is an example display of an information screen for an online wine store application without processing to enable filtering of an information screen via one or more static UI elements, according to some embodiments.

FIG. 11 is an example display of an information screen for an online wine store application represented by UI markup 1000 without processing to enable filtering of an information screen (e.g., search results) via one or more static UI elements, according to some embodiments. In FIG. 11, viewer application 107 may display UI markup 1000 as information screen 1101 without processing by UI adaptor 108. Information screen 1101 may be a web page. Information screen 1101 may also be a UI screen for a desktop, laptop, tablet, or smartphone software application. Information screen 1101 may also be a UI screen for a POS terminal. A static UI element may be, but is not limited to, text, an image, a video, a sound, or a symbol.

Information screen 1101 may include content area 1102. Content area 1102 may be a UI pane that displays a particular wine bottle's product details. While FIG. 11 is used to show what information screen 1101 would look like if no processing were performed, typically FIG. 11 would not be displayed if static UI elements were associated with stored filter responses. Instead, an information screen such as that in FIG. 12 would be displayed.

Figure 12:
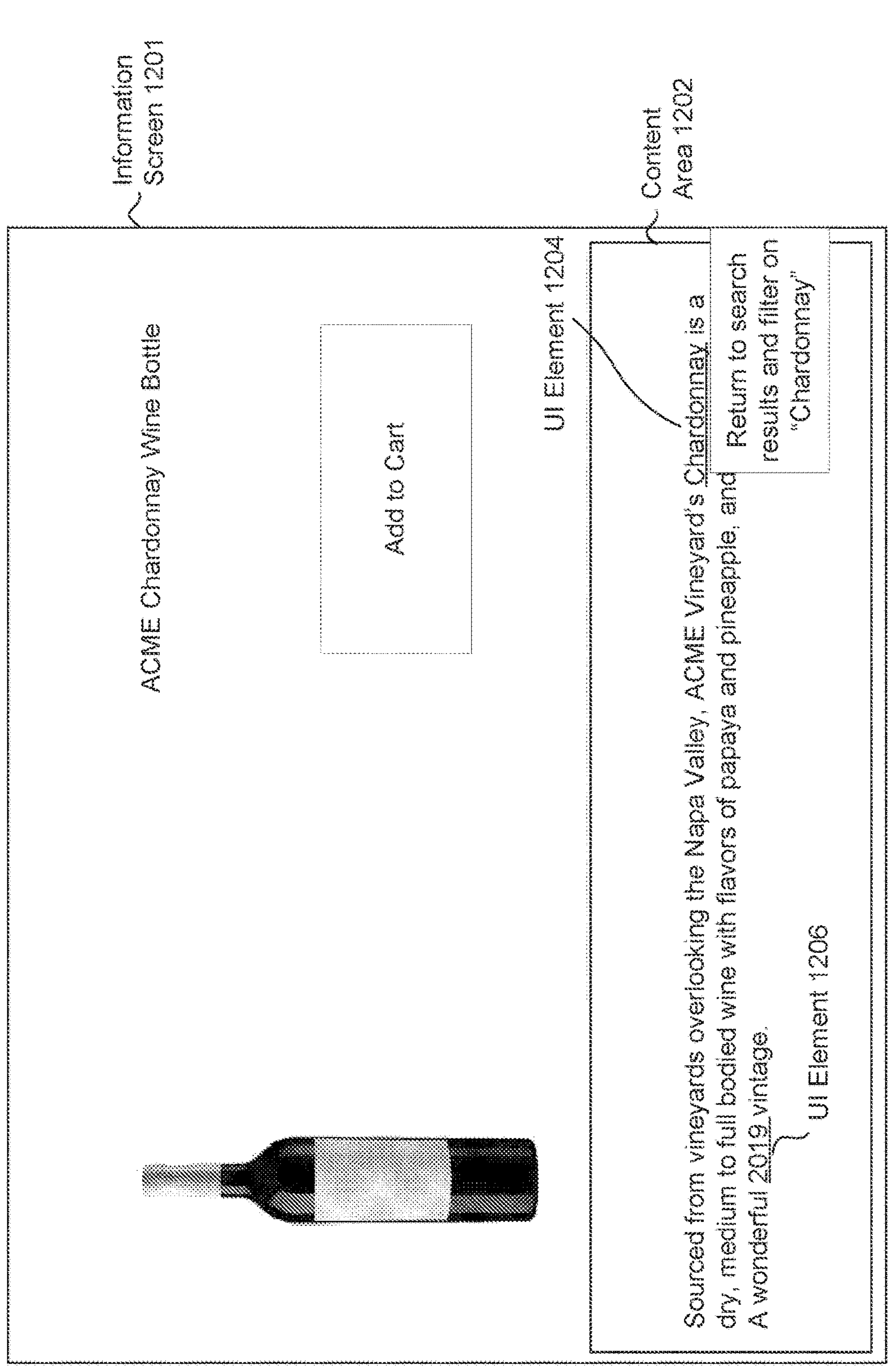
FIG. 12 is an example display of an information screen for an online wine store application after processing to enable filtering of an information screen via one or more static UI elements, according to some embodiments.

FIG. 12 is an example display of the information screen for an online wine store application represented by UI markup 1000 after processing to enable filtering of an information screen via one or more static UI elements, according to some embodiments. In FIG. 12, viewer application 107 may display UI markup 1000 as information screen 1201 after processing by UI adaptor 108. Information screen 1201 may be a web page similar to information screen 1101. Information screen 1201 may also be a UI screen for a desktop, laptop, tablet, or smartphone software application. Information screen 1201 may also be a UI screen for a POS terminal.

Information screen 1201 may include content area 1202. Content area 1202 may be a UI pane that displays a particular wine bottle's product details similar to content area 1102. Information screen 1201 may also include a new set of UI elements 1204 and 1206.

UI adaptor 108 may generate UI elements 1204 and 1206 based on a set of stored filter responses. For example, UI adaptor 108 may identify a parameter data structure (e.g., "id=content area") linked to content area 1102 in UI markup 1000 for information screen 1101. A parameter data structure may be a unique numerical identifier. A parameter data structure may also be a compound data structure including several fields. For example, the parameter data structure may include a numerical identifier field and a UI element type field. As would be appreciated by a person of ordinary skill in the art, a parameter data structure may include various other fields.

The numerical identifier field may be a unique numerical identifier linked to a UI element code for content area 1102. The UI element type field may indicate a type of UI element to generate. For example, the UI element type field may be set to "button" to generate a set of button UI elements. The UI element type field may also be set to "combo box" to generate one or more combo box UI elements. As would be appreciated by a person of ordinary skill in the art, the UI element type field may be set to various other values to generate various other types of UI elements.

An agent may link a parameter data structure to the UI element code for content area 1102 by modifying the UI code (e.g., UI markup 1000) that presents information screen 1102 for application 103. For example, the agent may link a parameter data structure to a UI element code for content area 1102 by modifying a hypertext markup language (HTML) document describing information screen 1102 for application 103. As would be appreciated by a person of ordinary skill in the art, the agent may link a parameter data structure to the UI element code for content area 1102 in information screen 1102 for application 103 using various other mechanisms.

The agent may specify a parameter data structure using a reserved attribute field linked to the UI element code. For example, the UI element code may be a HTML DIV tag and the parameter data structure may be an "id" attribute field. The "id" attribute field may be a reserved attribute field in the HTML standard. The UI element code may be linked to the parameter data structure using the following format: <div id="content_area">. By using a reserved attribute field, viewer application 107 may be able to still present an information screen (without generated UI elements that perform filtering) when UI adaptor 108 is not installed on, or being used by, a client device. Viewer application 107 may simply ignore the "id" attribute field. This can ensure backward compatibility with client devices that do not have UI adaptor 108 installed. On the other hand, if UI adaptor 108 is installed and being used by a client device, UI adaptor 108 may generate a set of UI elements that perform filtering based on the "name" attribute field (e.g., the parameter data structure) being set to "content_area."

The agent may also specify a parameter data structure using a new attribute field linked to the UI element code. For example, the UI element code may be a HTML DIV tag and the parameter data structure may be a HTML data attribute such as "content-area-ui-filter." The UI element code may be linked to the parameter data structure using the following format: <div content-area-ui-filter="1">. An agent may find such a HTML data attribute to be more flexible than a reserved HTML attribute because this HTML data attribute may have no usage rules or value restrictions. Moreover, if UI adaptor 108 is installed and executing on server 102, this type of HTML data attribute can be used to generate UI elements that perform filtering while preserving backward compatibility at different client devices. This is because UI adaptor 108 may generate the UI elements that perform filtering at server 102 before they are received at client device 106.

After identifying a parameter data structure (e.g., "id=content area") linked to content area 1102 in UI markup 1000 for information screen 1101, UI adaptor 108 may request a set of filter responses 1300 in FIG. 13 for static UI elements (e.g., word phrases) in content area 1102. As would be appreciated by a person of ordinary skill in the art, UI adaptor 108 may request filter responses for other types of static UI elements such as, but not limited to, such as images, videos, sounds, and symbols.

UI adaptor 108 may parse a static UI element to identify one or more characteristics of the static UI element. In the case of the static UI element representing a video, UI adaptor 108 may apply a computer vision algorithm to the static UI element to identify an object in the video. For example, UI adaptor 108 may identify a yellow kayak in the video. In the case of the static UI element representing audio, UI adaptor 108 may apply a speech recognition algorithm to the static UI element to identify spoken words in the audio. As would be appreciated by a person of ordinary skill in the art, UI adaptor 108 may parse the static UI element to identify various other characteristics of the static UI element.

UI adaptor 108 may generate a UI element (e.g., UI elements 1204 and 1206) for each static UI element matching or associated with a filter response in the set of filter responses 1300. For example, UI adaptor 108 may generate a UI element (e.g., UI elements 1204 and 1206) for a static UI element based on one or more identified characteristics of the static UI element matching or being associated with a filter response in the set of filter responses 1300. For example, UI adaptor 108 may generate a UI element for a static UI element representing a video based on the identification of a yellow kayak in the video that matches or is associated with a filter response in the set of filter responses 1300.

UI adaptor 108 may generate each UI element such that it requests an information screen (e.g., a search results page) and filters the requested information screen using the associated filter responses in the set of filter responses 1300. For example, in FIG. 12, UI adaptor 108 generates UI element 1204 for static UI element "Chardonnay," where UI element 1204 requests the search results page and applies the associated filter response "Chardonnay" to the search results page.

FIG. 13 shows an example set of filter responses 1300 for a system that processes UI code to enable filtering of an information screen via one or more static UI elements, according to some embodiments. For example, set of filter responses 1300 may be for an online wine store application. An agent of a business, organization, or government entity may insert, modify, or delete one or more filter responses from set of filter responses 1300. AI engine 110 may also generate set of filter responses 1300 as discussed above. Filter responses 1300 may be stored in data source 104.

In the example of FIG. 13, set of filter responses 1300 is a table with the following columns: ID 1322, filter response 1324, and filter category ID 1326. However, filter responses 1300 may implemented using various other columns and data structures as would be appreciated by a person of ordinary skill in the art.

In the example of FIG. 13, a filter response is represented as a row in set of filter responses 1300. A filter response in set of filter responses 1300 has a unique ID (e.g., ID 1322) and a filter response (e.g., filter response 1324). Filter response 324 may be a query, search string, regular expression, image, sound, or other type of data as would be appreciated by a person of ordinary skill in the art.

A filter response in set of filter responses 1300 may also be associated with a filter category 1332 in the table of set of filter categories 1328. A filter category 1332 may represent a category or class of filter responses. UI adaptor 108 may generate a UI element for a static UI element such that the generated UI element allows a user to filter a requested information screen using filter responses from filter responses 1300 that share a common filter category 1332.

A filter response in set of filter responses 1300 may be associated with filter category 1332 via filter category ID 1326 (e.g., a foreign key reference). In other words, a filter category ID 1326 can contain a reference to an ID 1330 in set of filter categories 1328. An ID 1330 is a numerical identifier that uniquely identifies a filter category 1332 in set of filter categories 1328.

By way of example, UI adaptor 108 may request filter responses from filter responses 1324 for the static UI elements "Chardonnay" and "2019" in content area 1102. In response, UI adaptor 108 can receive the requested filter responses (e.g., the filter response "Chardonnay" for static UI element "Chardonnay" and the filter response "2019" for static UI element "2019"). UI adaptor 108 can then generate UI elements 1204 and 1206 from the respective filter responses.

As part of requesting filter responses from stored filter responses (e.g., filter responses 1324), UI adaptor 108 may process the static UI elements in content area 1102 in turn. For example, UI adaptor 108 may read the first word phrase (e.g., "Sourced") from content area 1102. UI adaptor 108 may then request a set of filter responses and attempt to generate a UI element for the first word phrase. UI adaptor 108 may then repeat the process by reading the second word phrase (e.g., "from") and so on.

UI adaptor 108 may also process the static UI elements in content area 1102 in bulk. For example, UI adaptor 108 may read each word phrase from content area 1102 prior to requesting filter responses. UI adaptor 108 may then request the filter responses and attempt to generate UI elements for all the read word phrases. UI adaptor 108 may perform the identifying static UI elements, the requesting associated filter responses, and the generating UI elements for the static UI elements in various other orders or using various other techniques as a person of ordinary skill in the art would appreciate.

UI adaptor 108 may identify static UI elements of different sizes. For example, UI adaptor 108 may identify word phrases of different length. UI adaptor 108 may identify a single word phrase (e.g., "Source") or a multiple word phrase (e.g., "Sourced from vineyards overlooking the Napa Valley"). An agent can configure UI adaptor 108 to identify static UI elements of a particular maximum size (e.g., a maximum word length, maximum video length, maximum audio length, etc.).

UI adaptor 108 may skip identifying static UI elements in content area 1102 that are in an exclusion list. For example, UI adaptor 108 may skip identifying words such as, but not limited to, "a," "the," and "from" in content area 1102. The exclusion list can be stored on server 102, data source 104, client device 106, or any other system as a person of ordinary skill in the art would appreciate. An agent can configure which static UI elements are present in the exclusion list.

After identifying a static UI element, UI adaptor 108 may request a set of filter responses for the static UI element (e.g., a word phrase, video, audio recording, etc.) to generate a UI element (e.g., UI element 1204) that requests an information screen and filters the information screen using the set of filter responses. For example, UI adaptor 108 may identify the word phrase "Chardonnay" in content area 1102. UI adaptor 108 may then request a set of filter responses for "Chardonnay" in filter responses 1324.

UI adaptor 108 may request a set of filter responses that are associated with the static UI element. UI adaptor 108 may directly determine whether the set of filter responses are associated with the static UI element as part of the request. UI adaptor 108 may also request that server 102 or data store 104 determine whether the set of filter responses are associated with the static UI element as part of the request.

UI adaptor 108 may request a set of filter responses that identically match the static UI element. For example, UI adaptor 108 may request the filter response 1324 of "Chardonnay" for static UI element "Chardonnay" because it identically matches the static UI element "Chardonnay" in content area 1102.

UI adaptor 108 may also request a set of filter responses that are similar to, but not identical to, the static UI element. For example, UI adaptor 108 may request a filter response for a static UI element because the word edit distance between the requested filter response and the static UI element is less than a threshold value. As would be appreciated by a person of ordinary skill in the art, the similarity between a filter response and a static UI element can be determined using various other techniques such as, but not limited to, audio similarity algorithms and image similarity algorithms.

UI adaptor 108 may also request a set of filter responses that are logically associated with the static UI element. For example, UI adaptor 108 may request the filter responses 1324 of "Chardonnay," "Riesling," and "Sauvignon Blanc" because they are logically associated with the static UI element "Chardonnay" in content area 1102. This may be because all three filter responses 1324 share the same filter category 1332 of "Grape Variety."

UI adaptor 108 may also request a set of filter responses for the static UI element based on one or more characteristics assigned to the static UI element, the stored filter responses, characteristics of a user, or characteristics of client device 106 as discussed above. For example, UI adaptor 108 may request a set of filter responses for the static UI element based on one or more identified characteristics of the static UI element (e.g., an object in a video represented by the static UI element or spoken words in an audio recording represented by the static UI element). UI adaptor 108 may also request a set of filter responses for the static UI element according to various other techniques as discussed above.

By way of example, and not limitation, UI adaptor 108 may match the static UI element of "Chardonnay" to the filter response 1324 of "Chardonnay" in filter responses 1324. In response to detecting a match, UI adaptor 108 may generate a UI element 1204 for the static UI element of "Chardonnay." For example, UI adaptor 108 may generate a UI element 1204 that (1) requests an information screen (e.g., return to search results) and (2) filters the requested information screen based on the matched filter response 1324 of "Chardonnay." As a result, UI adaptor 108 may generate a UI element (e.g., UI element 1204) for a static UI element (e.g., the text "Chardonnay") that simultaneously performs two actions: request an information screen (e.g., return to the search results) and apply a matched filter response (e.g., "Chardonnay") to the requested information screen.

Similarly, by way of example and not limitation, UI adaptor 108 may request a set of filter responses by comparing the static UI element (e.g., "Chardonnay") to a filter response in the filter responses 1324. For example, UI adaptor 108 may match the word phrase "Chardonnay" to the filter response of "Chardonnay" in filter responses 1324. UI adaptor 108 may then request a set of filter responses associated with the matched filter response 1324 of "Chardonnay." For example, UI adaptor 108 may determine that filter response 1324 is associated with a filter category 1332 of "Grape Variety." UI adaptor 108 may then request the set of filter responses 1324 having a filter category 1332 of "Grape Variety": "Chardonnay," "Riesling," and "Sauvignon Blanc."

In response to receiving the set of filter responses, UI adaptor 108 may generate a UI element (e.g., UI element 1204) for the static UI element of "Chardonnay." UI adaptor 108 may generate a UI element that (1) requests an information screen (e.g., return to search results) and (2) filters the requested information screen based on a user selection of one of the received set of filters responses (e.g., using a drop down menu, list box, combo box, etc.) For example, the UI element may be a drop down menu having the following options: "Return to search results and filter on "Chardonnay," "Return to search results and filter on "Riesling," and "Return to search results and filter on "Sauvignon Blanc." UI adaptor 108 can also generate the UI element as a set of UI elements, one for each received filter response as discussed above.

UI adaptor 108 may configure the generated UI element to perform an action (e.g., request an information screen) and perform filtering using a filter response using a Hypertext Transfer Protocol (HTTP) GET request. For example, UI adaptor 108 may configure UI element 1204 to execute search.php and perform filtering using the response "Chardonnay" by issuing the GET request search.php?filter="Chardonnay" to server 102. As would be appreciated by a person of ordinary skill in the art, UI adaptor 108 may configure a UI element to perform filtering using a filter response using various other mechanisms (e.g., an HTTP POST request, JavaScript, Java, or PUP).

UI adaptor 108 can configure the generated UI element (e.g., UI element 1204) to request the information screen (e.g., return to search results) based on a state associated with the requested information screen (e.g., the search results). This can allow the user to overlay filter criteria to any existing state (e.g., other filter criteria) previously applied to the requested information screen. For example, the user may want to apply particular criteria about the just viewed wine bottle (e.g., "Chardonnay") to their previous search results (e.g., wine bottles less than $50). As would be appreciated by a person of ordinary skill in the art, UI adaptor 108 can also configure the generated UI element (e.g., UI element 1204) to request the information screen independent of a state associated with the requested information screen.

UI adaptor 108 can maintain the state for the information screen to be requested using a cookie. UI adaptor 108 can also maintain the state for the information screen to be requested using a session identifier (e.g., a session identifier for a web browser session). Additionally or alternatively, UI adaptor 108 can maintain the state for the information screen to be requested using a data item in a World Wide Web Consortium (W3C) Web Storage Application Programming Interface (API) based storage such as, but not limited to, localStorage or sessionStorage. Additionally or alternatively, UI adaptor 108 can maintain the state for the information screen to be requested using a data item in a W3C Indexed Database (IndexedDB) API based storage. As would be appreciated by a person of ordinary skill in the art, UI adaptor 108 can maintain the state for the information screen to be requested using various other client side or server side techniques.

By way of example, and not limitation, UI adaptor 108 may configure UI element 1204 to request a search results information screen (e.g., execute search.php) and perform filtering of the requested search results information screen using the filter response "Chardonnay" by issuing the GET request search.php?filter="Chardonnay" to server 102. UI adaptor 108 may configure UI element 1204 to request the search results information screen according to the state representing the user's previous load of the search results information screen.

To do so, UI adaptor 108 may retrieve the state representing the user's previous load of the search results information screen. For example, UI adaptor 108 may retrieve a cookie or session identifier representing the user's previous load of the search results information screen. UI adaptor 108 may then configure UI element 1204 so that when it requests the search results information screen, the state representing the user's previous load of the search results information screen is also provided to server 102.

For example, UI adaptor 108 may retrieve the session identifier representing the user's previous load of an information screen using JavaScript. UI adaptor 108 may then build a hyperlink for UI element 1204. The hyperlink may include a link to the information screen, the session identifier, and additional filter criteria to apply on top of the existing state previously applied to the requested information screen.

Figure 14:
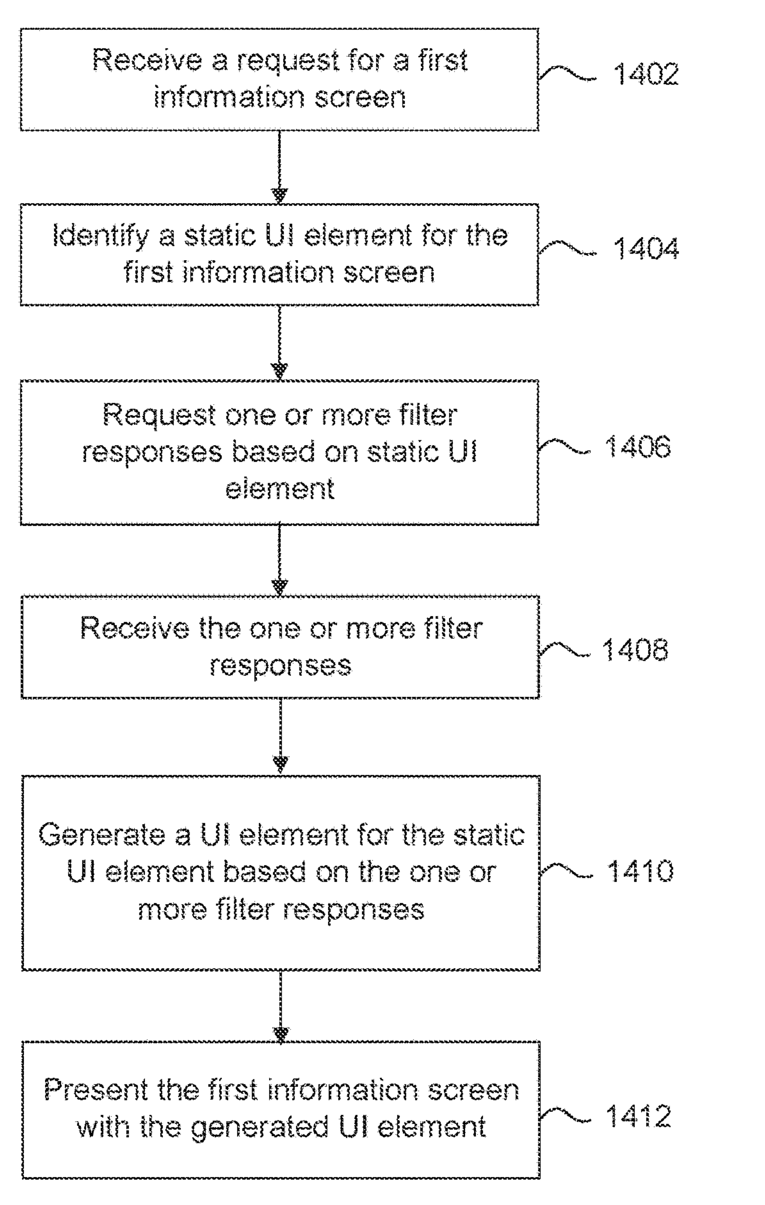
FIG. 14 is a flowchart illustrating a process for processing a UI to enable filtering of an information screen via one or more static UI elements, according to some embodiments.

FIG. 14 is a flowchart for a method 1400 for processing a UI to enable filtering of an information screen via one or more static UI elements, according to an embodiment. Method 1400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 14, as would be understood by a person of ordinary skill in the art.

Method 1400 shall be described with reference to FIGS. 1, 2, and 10-13. However, method 1400 is not limited to those example embodiments.

In 1402, UI adaptor 108 receives a request for a first information screen for application 103 from a client device 106.

In 1404, UI adaptor 108 identifies a static UI element for the first information screen. For example, UI adaptor 106 may identify the static UI element in in UI code for the first information screen. The static UI element may be text, an image, a video, a sound, a symbol, or other type of static UI element as a person of ordinary skill in the art would appreciate.

UI adaptor 108 may identify the static UI element based on a parameter data structure. For example, UI adaptor 108 may identify the static UI element "Chardonnay" in content area 1102 based on the parameter data structure "id=content_area" being linked to content area 1102 in UI markup 1000 for information screen 1101.

UI adaptor 108 may also identify the static UI element based on the static UI element not being in an exclusion list. For example, UI adaptor 108 may skip identifying static UI elements such as, but not limited to, "a," "the," and "from."

UI adaptor 108 may also identify the static UI element based on the static UI element being less than a maximum size. For example, UI adaptor 108 may identify the static UI element based on the static UI element being less than a maximum word length.

UI adaptor 108 may also parse the static UI element to identify one or more characteristics of the static UI element. In the case of the static UI element representing a video, UI adaptor 108 may apply a computer vision algorithm to the static UI element to identify an object in the video. For example, UI adaptor 108 may identify a yellow kayak in the video. In the case of the static UI element representing audio, UI adaptor 108 may apply a speech recognition algorithm to the static UI element to identify spoken words in the audio. As would be appreciated by a person of ordinary skill in the art, UI adaptor 108 may parse the static UI element to identify various other characteristics of the static UI element.

In 1406, UI adaptor 108 requests one or more filter responses from data source 104 based on the static UI element. The one or more filter responses may be generated using an artificial intelligence engine (e.g., AI engine 110) based on running a multivariant test for a period of time involving a threshold number of users. The one or more filter responses may also be generated using an artificial intelligence engine (e.g., AI engine 110) based on at least one of a periodic schedule, a category associated with the parameter data structure, a user profile associated with a user operating the electronic device, or a context variable. The context variable may represent a previous user interaction or a characteristic of a client device (e.g., client device 106).

UI adaptor 108 may request one or more filter responses from data source 104 that are associated with the static UI element. For example, UI adaptor 108 may request a filter response from data source 104 that identically matches the static UI element.

UI adaptor 108 may also request a filter response from data source 104 that is similar to, but not identical to, the static UI element. For example, UI adaptor 108 may request a filter response from data source 104 such that a word edit distance between the filter response and the static UI element is less than a threshold value. As would be appreciated by a person of ordinary skill in the art, the similarity between a filter response and a static UI element can be determined using various other techniques.

UI adaptor 108 may also request a set of filter responses from data source 104 that are logically associated with the static UI element. UI adaptor 108 may request the set of filter responses from data source 104 based on the set of filter responses sharing the same filter category (e.g., filter category 1332). For example, UI adaptor 108 may request the filter responses 1324 of "Chardonnay," "Riesling," and "Sauvignon Blanc" because they are logically associated with the static UI element "Chardonnay" in content area 1102. This may be because they three filter responses 1324 share the same filter category 1332 of "Grape Variety."

UI adaptor 108 may also request a set of filter responses from data source 104 based on at least one of a category, a user profile associated with a user operating the electronic device, or a context variable. The context variable may represent a previous user interaction or a characteristic of a client device (e.g., client device 106).

UI adaptor 108 may also request a set of filter responses from data source 104 based on one or more identified characteristics of the static UI element matching or being associated with a filter response in the set of filter responses 1300. For example, UI adaptor 108 may generate a UI element for a static UI element representing a video based on the identification of a yellow kayak in the video that matches or is associated with a filter response in the set of filter responses 1300 (e.g., "Yellow Kayak," "2 Person Kayak," "Small Boat," etc.)

In 1408, UI adaptor 108 receives the one or more filter responses. For example, UI adaptor 108 receives the one or more filter responses based on the one or more filter responses being associated with the static UI element.

In 1410, UI adaptor 108 generates a UI element in place of the static UI element based at least in part on the one or more filter responses. The UI adaptor 108 can configure the UI element to perform a first action of requesting a second information screen and a second action comprising filtering the second information screen using the one or more filter responses.

UI adaptor 108 can generate the UI element in place of the static UI element in the first information screen based at least in part on the one or more filter responses and a state associated with the second information screen. UI adaptor 108 may retrieve the state and configure the UI element so that requests the second information screen with its associated state. This can allow the user to overlay filter criteria to any existing state (e.g., other filter criteria) previously applied to the second information screen.

UI adaptor 108 can maintain the state for the second information screen using a cookie. UI adaptor 108 can also maintain the state for the second information screen using a session identifier (e.g., a session identifier for a web browser session). UI adaptor 108 can also maintain the state for the second information screen using various other client side or server side techniques as a person of ordinary skill in the art would appreciate.

In 1412, UI adaptor 108 presents the first information screen for application 103 on client device 106 using viewer application 107. In some embodiments, if UI adaptor 108 is located in server 102, UI adaptor 108 may transmit the first information screen for application 103 to client device 106 for presentation by viewer application 107.

UI adaptor 108 may perform one or more of the identifying, requesting, and generating at the time the first information screen is loaded. UI adaptor 108 may also perform one or more of the identifying, requesting, and generating based on a user interaction with an already loaded first information screen (e.g. tapping a UI element in the loaded first information screen with an associated parameter data structure causes UI adaptor 108 to identify, request, and generate). UI adaptor 108 may also perform one or more of the identifying, requesting, and generating based on a characteristic of the device that UI adaptor 108 is being executed on.

UI adaptor 108 may process the static UI elements in content area 1102 in turn. For example, UI adaptor 108 may read the first word phrase (e.g., "Sourced") from content area 1102. UI adaptor 108 may then request one or more filter responses and attempt to generate a UI element for the first word phrase. UI adaptor 108 may then repeat the process by reading the second word phrase (e.g., "from") and so on. UI adaptor 108 may also perform the identifying static UI elements, the requesting filter responses, and the generating UI elements for the static UI elements in various other orders or using various other techniques as a person of ordinary skill in the art would appreciate.

Figure 15:
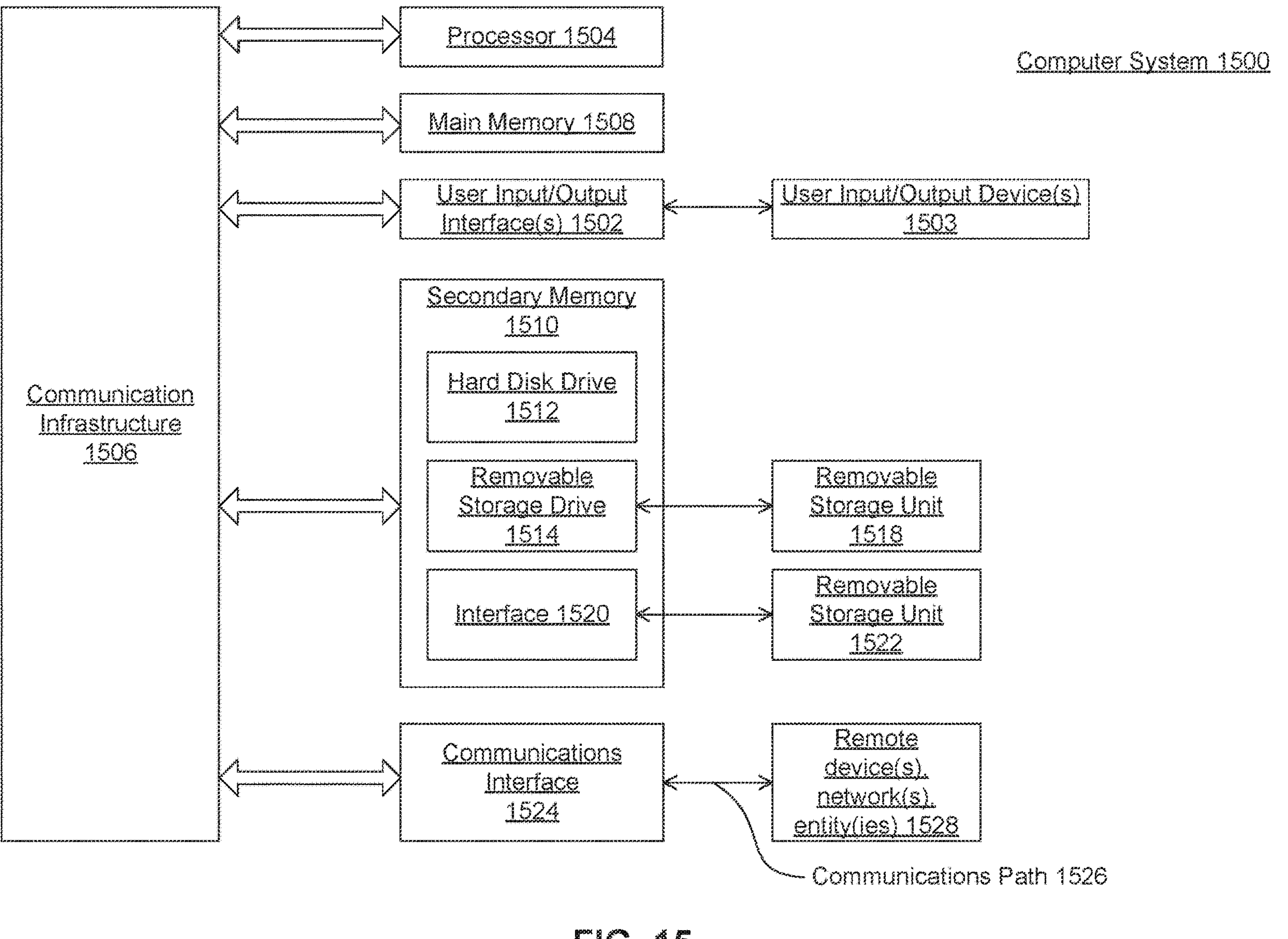
FIG. 15 is an example computer system useful for implementing various embodiments.

Various embodiments can be implemented, for example, using one or more computer systems, such as computer system 1500 shown in FIG. 15. Computer system 1500 can be used, for example, to implement methods 900 and 1400 of FIGS. 9 and 14, respectively. For example, computer system 1500 can identify UI elements in an information screen based on a parameter data structure. Computer system 1500 can further generate a new set of UI elements based on the identified UI elements, according to some embodiments. Computer system 1500 can be any computer capable of performing the functions described herein.

Computer system 1500 can be any well-known computer capable of performing the functions described herein.

Computer system 1500 includes one or more processors (also called central processing units, or CPUs), such as a processor 1504. Processor 1504 is connected to a communication infrastructure or bus 1506.

One or more processors 1504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 also includes user input/output device(s) 1503, such as monitors, keyboards, pointing devices, etc., that communicate with communication infrastructure 1506 through user input/output interface(s) 1502.

Computer system 1500 also includes a main or primary memory 1508, such as random access memory (RAM). Main memory 1508 may include one or more levels of cache. Main memory 1508 has stored therein control logic (i.e., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to an example embodiment, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

In an embodiment, a tangible apparatus or article of manufacture comprising a tangible computer useable or readable medium having control logic (software) stored thereon is also referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 15. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all example embodiments of the invention as contemplated by the inventor(s), and thus, are not intended to limit the invention or the appended claims in any way.

While the invention has been described herein with reference to example embodiments for example fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described example embodiments, but should be defined only in accordance with the following claims and their equivalents.

What is claimed is:

1. A computer-implemented method for processing an information screen to enable filtering of another information screen, comprising:

identifying a user interface (UI) element code for the information screen based at least in part on a parameter data structure, wherein the UI element code is configured to perform a first action comprising requesting the other information screen;

requesting, from an artificial intelligence engine, a set of filter responses of a plurality of filter responses based at least in part on the parameter data structure, wherein the artificial intelligence engine selects the set of filter responses based on calculating a respective score for how each set of filter responses of the plurality of filter responses performs over a period of time involving a threshold number of users;

receiving the set of filter responses;

generating a variation of the information screen with a set of UI elements based at least in part on the UI element code and the set of filter responses, wherein each UI element in the set of UI elements is configured to perform the first action performed by the UI element code and a second action comprising filtering the other information screen using a filter response in the set of filter responses; and outputting the variation of the information screen with the set of UI elements.

2. The computer-implemented method of claim 1, wherein the requesting comprises:

requesting the set of filter responses from the artificial intelligence engine based on at least one of a category, a user profile, or a context variable, wherein the context variable is based on a previous user interaction or a characteristic of an electronic device.

3. The computer-implemented method of claim 1, wherein the generating comprises:

generating the set of UI elements in place of the UI element code based on an order of the set of filter responses.

4. The computer-implemented method of claim 1, wherein the set of filter responses is generated using the artificial intelligence engine based on at least one of a periodic schedule, a category associated with the parameter data structure, a user profile, or a context variable, wherein the context variable is based on a previous user interaction or a characteristic of an electronic device.

5. The computer-implemented method of claim 1, wherein the artificial intelligence engine orders a filter response in the set of filter responses based on an ordinal number or a weight associated with the filter response.

6. The computer-implemented method of claim 1, wherein the artificial intelligence engine selects a first filter response from a first set of filter responses based on a weight or a category associated with the first filter response, selects a second filter response from a second set of filter responses based on a weight or a category associated with the second filter response, and aggregates the first filter response and the second filter response into the set of filter responses.

7. The computer-implemented method of claim 6, wherein the artificial intelligence engine selects the first set of filter responses based on a user profile being associated with the first set of filter responses, and selects the second set of filter responses based on the user profile being associated with the second set of filter responses.

8. A system, comprising:

one or more memories; and at least one processor coupled to at least one of the memories and configured to perform operations comprising:

identifying a user interface (UI) element code for an information screen based at least in part on a parameter data structure, wherein the UI element code is configured to perform a first action comprising requesting another information screen;

requesting, from an artificial intelligence engine, a set of filter responses of a plurality of filter responses based at least in part on the parameter data structure, wherein the artificial intelligence engine selects the set of filter responses based on calculating a respective score for how each set of filter responses of the plurality of filter responses performs over a period of time involving a threshold number of users;

receiving the set of filter responses;

generating a variation of the information screen with a set of UI elements based at least in part on the UI element code and the set of filter responses, wherein each UI element in the set of UI elements is configured to perform the first action performed by the UI element code and a second action comprising filtering the other information screen using a filter response in the set of filter responses; and outputting the variation of the information screen with the set of UI elements.

9. The system of claim 8, wherein the requesting the set of filter responses comprises:

requesting the set of filter responses from the artificial intelligence engine based on at least one of a category, a user profile, or a context variable, wherein the context variable is based on a previous user interaction or a characteristic of the system.

10. The system of claim 8, wherein the generating the set of UI elements comprise:

generate the set of UI elements in place of the UI element code based on an order of the set of filter responses.

11. The system of claim 8, wherein the set of filter responses is generated using the artificial intelligence engine based on at least one of a periodic schedule, a category associated with the parameter data structure, a user profile, or a context variable, wherein the context variable is based on a previous user interaction or a characteristic of the system.

12. The system of claim 8, wherein the artificial intelligence engine orders a filter response in the set of filter responses based on an ordinal number or a weight associated with the filter response.

13. The system of claim 8, wherein the artificial intelligence engine selects a first filter response from a first set of filter responses based on a weight or a category associated with the first filter response, selects a second filter response from a second set of filter responses based on a weight or a category associated with the second filter response, and aggregates the first filter response and the second filter response into the set of filter responses.

14. The system of claim 13, wherein the artificial intelligence engine selects the first set of filter responses based on a user profile being associated with the first set of filter responses, and selects the second set of filter responses based on the user profile being associated with the second set of filter responses.

15. A non-transitory computer-readable medium having instructions stored thereon that, when executed by at least one computing device, causes the at least one computing device to perform operations comprising:

identifying a user interface (UI) element code for an information screen based at least in part on a parameter data structure, wherein the UI element code is configured to perform a first action comprising requesting another information screen;

requesting, from an artificial intelligence engine, a set of filter responses of a plurality of filter responses based at least in part on the parameter data structure, wherein the artificial intelligence engine selects the set of filter responses based on calculating a respective score for how each set of filter responses of the plurality of filter responses performs over a period of time involving a threshold number of users;

receiving the set of filter responses;

generating a variation of the information screen with a set of UI elements based at least in part on the UI element code and the set of filter responses, wherein each UI element in the set of UI elements is configured to perform the first action performed by the UI element code and a second action comprising filtering the other information screen using a filter response in the set of filter responses; and outputting the variation of the information screen with the set of UI elements.

16. The non-transitory computer-readable medium of claim 15, wherein the requesting comprises:

requesting the set of filter responses from the artificial intelligence engine based on at least one of a category, a user profile, or a context variable, wherein the context variable is based on a previous user interaction or a characteristic of the at least one computing device.

17. The non-transitory computer-readable medium of claim 15, wherein the generating comprises:

generating the set of UI elements in place of the UI element code based on an order of the set of filter responses.

18. The non-transitory computer-readable medium of claim 15, wherein the set of filter responses is generated using the artificial intelligence engine based on at least one of a periodic schedule, a category associated with the parameter data structure, a user profile, or a context variable, wherein the context variable is based on a previous user interaction or a characteristic of the at least one computing device.

19. The non-transitory computer-readable medium of claim 15, wherein the artificial intelligence engine orders a filter response in the set of filter responses based on an ordinal number or a weight associated with the filter response.

20. The non-transitory computer-readable medium of claim 15, wherein the artificial intelligence engine selects a first filter response from a first set of filter responses based on a weight or a category associated with the first filter response, selects a second filter response from a second set of filter responses based on a weight or a category associated with the second filter response, and aggregates the first filter response and the second filter response into the set of filter responses.

* * * * *